US009083058B2

(12) United States Patent
Nakagawa et al.

(10) Patent No.: US 9,083,058 B2
(45) Date of Patent: Jul. 14, 2015

(54) NONAQUEOUS ELECTROLYTIC SOLUTION AND NONAQUEOUS-ELECTROLYTE BATTERY

(75) Inventors: Yumiko Nakagawa, Ibaraki (JP); Minoru Kotato, Ibaraki (JP); Daisuke Noda, Ibaraki (JP); Shinichi Kinoshita, Ibaraki (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 575 days.

(21) Appl. No.: 12/920,186

(22) PCT Filed: Feb. 27, 2009

(86) PCT No.: PCT/JP2009/053701
§ 371 (c)(1),
(2), (4) Date: Dec. 3, 2010

(87) PCT Pub. No.: WO2009/107786
PCT Pub. Date: Sep. 3, 2009

(65) Prior Publication Data
US 2011/0123871 A1    May 26, 2011

(30) Foreign Application Priority Data

| Feb. 29, 2008 | (JP) | 2008-049154 |
| Jun. 6, 2008 | (JP) | 2008-149723 |
| Jun. 18, 2008 | (JP) | 2008-159333 |

(51) Int. Cl.
*H01M 6/16* (2006.01)
*H01M 10/0567* (2010.01)
*H01M 10/0525* (2010.01)
*H01M 10/0569* (2010.01)
*H01M 4/131* (2010.01)
*H01M 4/133* (2010.01)

(52) U.S. Cl.
CPC ...... *H01M 10/0567* (2013.01); *H01M 10/0525* (2013.01); *H01M 10/0569* (2013.01); *H01M 4/131* (2013.01); *H01M 4/133* (2013.01); *H01M 2300/0042* (2013.01); *Y02E 60/122* (2013.01)

(58) Field of Classification Search
CPC .......................................... H01M 6/16
USPC ................... 429/207, 218.1, 326, 341
See application file for complete search history.

(56) References Cited

U.S. PATENT DOCUMENTS

| 5,776,627 A | 7/1998 | Mao et al. | |
| 5,879,834 A | 3/1999 | Mao | |
| 6,033,797 A | 3/2000 | Mao et al. | |
| 6,686,094 B2* | 2/2004 | Omaru et al. | 429/232 |
| 2003/0003358 A1 | 1/2003 | Mandal et al. | |
| 2005/0118512 A1* | 6/2005 | Onuki et al. | 429/326 |
| 2005/0277027 A1 | 12/2005 | Kim et al. | |
| 2006/0172201 A1 | 8/2006 | Yasukawa et al. | |
| 2007/0238025 A1 | 10/2007 | Onuki et al. | |
| 2009/0053598 A1 | 2/2009 | Abe et al. | |
| 2010/0015514 A1 | 1/2010 | Miyagi et al. | |
| 2013/0052541 A1 | 2/2013 | Abe et al. | |

FOREIGN PATENT DOCUMENTS

| CN | 1553539 A | 12/2004 |
| CN | 101107745 A | 1/2008 |
| JP | 61-227377 | 10/1986 |
| JP | S61-284070 | 12/1986 |
| JP | H02-244565 | 9/1990 |
| JP | 7-114940 | 5/1995 |
| JP | 08-106909 | 4/1996 |
| JP | 8-293323 | 11/1996 |
| JP | 09-022722 | 1/1997 |
| JP | 9-106835 | 4/1997 |
| JP | 9-171840 | 6/1997 |
| JP | 09-223516 | 8/1997 |
| JP | H10-154528 | 6/1998 |
| JP | 2000-58115 | 2/2000 |
| JP | 2000-106210 | 4/2000 |
| JP | 2000-182663 | 6/2000 |
| JP | 2001-15155 | 1/2001 |
| JP | 2001-28272 | 1/2001 |
| JP | 2002-50398 | 2/2002 |
| JP | 2002-203597 | 7/2002 |
| JP | 2003-243026 | 8/2003 |
| JP | 2003-297423 A | 10/2003 |
| JP | 2004-031079 | 1/2004 |
| JP | 2004-63432 | 2/2004 |
| JP | 2004-111169 | 4/2004 |
| JP | 2004-296237 | 10/2004 |

(Continued)

OTHER PUBLICATIONS

JP,2000-058115,A translation.pdf.*
JP 2001-28272 translation.pdf.*
JP,2007-173180,translation.pdf.*
JP 61-227377 part.translation.*
JP 2002-203597 MT.*
JP2005-347240 MT.*
JP2007-134245.*
International Search Report issued Jun. 9, 2009, in PCT/JP2009/053701.
Braja K. Mandal, et al., "Thermal runaway inhibitors for lithium battery electrolytes", Journal of Power Sources, vol. 161, 2006, pp. 1341-1345.

(Continued)

*Primary Examiner* — Patrick Ryan
*Assistant Examiner* — Alex Usyatinsky
(74) *Attorney, Agent, or Firm* — Oblon, McClelland, Maier & Neustadt, L.L.P.

(57) ABSTRACT

Disclosed is a nonaqueous electrolytic solution which enables formation of a nonaqueous-electrolyte battery having high capacity and excellent storage characteristics at high temperatures, while sufficiently enhancing safety at the time of overcharge. A nonaqueous-electrolyte battery produced by using the nonaqueous electrolytic solution is also disclosed. The nonaqueous electrolytic solution comprises an electrolyte and a nonaqueous solvent, and includes any of specific nonaqueous electrolytic solutions (A) to (D).

4 Claims, No Drawings

(56) References Cited

FOREIGN PATENT DOCUMENTS

| | | |
|---|---|---|
| JP | 2005-116327 | 4/2005 |
| JP | 2005-322634 | 11/2005 |
| JP | 2005-347240 | 12/2005 |
| JP | 2006-221972 | 8/2006 |
| JP | 2007-115583 | 5/2007 |
| JP | 2007-134245 | 5/2007 |
| JP | 2007-141830 | 6/2007 |
| JP | 2007-141830 A | 6/2007 |
| JP | 2007-149654 A | 6/2007 |
| JP | 2007-165125 | 6/2007 |
| JP | 2007-173180 | 7/2007 |
| JP | 2007-227368 | 9/2007 |
| JP | 2007-287658 A | 11/2007 |
| JP | 2008-041635 | 2/2008 |
| JP | 2008-103330 A | 5/2008 |
| JP | 2009-051800 | 3/2009 |
| JP | 2009-231283 A | 10/2009 |
| WO | WO2005/029631 | 3/2005 |
| WO | 2005/091422 | 9/2005 |
| WO | WO 2006/077763 A1 | 7/2006 |
| WO | WO2006/077764 A | 7/2006 |
| WO | WO2006/077765 A | 7/2006 |

OTHER PUBLICATIONS

Supplementary European Search Report issued Feb. 15, 2012, in the corresponding European Patent Application No. 09715213.6-1227 / 2249426, filed Feb. 27, 2009 (with English-language Translation).
Office Action issued Aug. 31, 2012 in Chinese Patent Application No. 200980106400.8 w/English translation.
Information Offer Form issued Oct. 29, 2013 in Japanese Patent Application No. 2009-046754 (with English language translation).
Office Action issued Oct. 1, 2013 in Japanese Patent Application No. 2009-144524 (with English language translation).
Chinese Office Action issued Jul. 19, 2013 in Patent Application No. 200980106400.8 filed Feb. 27, 2009 (with English Translation ).
Chinese Office Action issued Apr. 4, 2014 in Patent Application No. 200980106400.8 filed Feb. 27, 2009 (with English Translation).
U.S. Appl. No. 13/692,673, filed Dec. 3, 2012, Kotato, et al.
Japanese Office Action issued Jan. 29, 2013, in Patent Application No. 2008-149723 (with English-language translation).
Second Office Action issued Mar. 22, 2013, in Chinese Patent Application No. 200980106400.8 filed Feb. 27, 2009 (with English translation).
Office Action issued Jul. 23, 2013, in Japanese Patent Application No. 2009-046754 (with English-language translation).
Office Action issued Apr. 15, 2014, in Japanese Patent Application No. 2009-046754, with English-language translation.
Office Action issued Dec. 24, 2013, in Japanese Patent Application No. 2008-149723 filed Jun. 6, 2008 (with English translation).
Office Action issued Aug. 5, 2014, in Japanese Patent Application No. 2013-195467 filed Sep. 20, 2013 (with English translation).
Office Action issued Jul. 18, 2014, in Chinese Patent Application No. 201310009078.5 filed Feb. 27, 2009 (with English translation).
Notification of Reasons for Refusal issued Jan. 13, 2015, in Japanese Patent Application No. 2014-030910 (with English translation).
Notification of Reasons for Refusal issued Feb. 17, 2015, in Japanese Patent Application No. 2014-091584 (with English translation).
Office Action (Final Rejection) issued Mar. 24, 2015 in Japanese Patent Application No. 2013-195467 with English translation.

* cited by examiner

NONAQUEOUS ELECTROLYTIC SOLUTION AND NONAQUEOUS-ELECTROLYTE BATTERY

TECHNICAL FIELD

The present invention relates to a nonaqueous electrolytic solution and a nonaqueous-electrolyte battery employing the electrolytic solution.

BACKGROUND ART

Nonaqueous-electrolyte batteries such as lithium secondary batteries are coming to be practically used in extensive applications ranging, for example, from so-called household power sources for portable telephones, notebook personal computers, and so on to driving batteries equipped on vehicles such as automobiles. However, recent nonaqueous-electrolyte batteries are increasingly required to have higher performances, and there is a desire for improvements in battery characteristics.

Electrolytic solutions for use in nonaqueous-electrolyte batteries are usually constituted mainly of an electrolyte and a nonaqueous solvent. As main components of the nonaqueous solvent, for example, cyclic carbonates such as ethylene carbonate and propylene carbonate; chain carbonates such as dimethyl carbonate, diethyl carbonate, and ethyl methyl carbonate; cyclic carboxylic acid esters such as γ-butyrolactone and γ-valerolactone; and the like is used.

Various investigations are being made on nonaqueous solvents and electrolytes in order to improve the battery characteristics of such nonaqueous-electrolyte batteries, such as load characteristics, cycle characteristics, and storability, or to enhance battery safety during overcharge.

Patent document 1 proposes a technique in which an additive that polymerizes at a battery voltage not lower than the maximum working voltage of a battery is incorporated into an electrolytic solution to thereby increase the internal resistance of the battery and protect the battery. Patent document 2 proposes a technique which by mixing an additive into an electrolyte, which polymerizes and thereby generates gas and pressure, at a battery voltage not lower than the maximum working voltage, thus enable an internal circuit breaker for the purpose of protection against overcharge to work without fail. Aromatic compounds such as biphenyl, thiophene, and furan are disclosed as those additives.

Furthermore, patent document 3 proposes a nonaqueous-electrolyte secondary battery system including: a nonaqueous-electrolyte secondary battery in which phenylcyclohexane has been added to the nonaqueous electrolytic solution in an amount in the range of 0.1-20% by weight in order to inhibit battery characteristics from decreasing when biphenyl or thiophene is used; and a charge control system which detects an increase in battery temperature to break the charging circuit.

On the other hand, patent document 4 proposes a technique in which an organic solvent selected from carbonates having a phenyl group, such as methyl phenyl carbonate, esters, and ethers is used to thereby improve the affinity of the electrolytic solution for carbon electrodes and attain size reduction, performance enhancement, and productivity improvement in lithium ion batteries.

Patent document 5 proposes that a phosphoric acid triester should be added to an electrolytic solution in order to improve cycle characteristics.

Furthermore, patent document 6 proposes an electrolyte characterized by containing a solvent including diphenyl carbonate in an amount in the range of from 0.5% by mass to 10% by mass and further including a cyclic carbonic acid ester of an unsaturated compound in an amount in the range of from 0.5% by mass to 5% by mass, in order to inhibit battery swelling during high-temperature storage while inhibiting the efficiency of initial charge/discharge from decreasing. There is a statement therein to the effect that vinylethylene carbonate is preferred as the cyclic carbonic acid ester of an unsaturated compound.

Patent Document 1: JP-A-9-106835
Patent Document 2: JP-A-9-171840
Patent Document 3: JP-A-2002-50398
Patent Document 4: JP-A-8-293323
Patent Document 5: JP-A-7-114940
Patent Document 6: JP-A-2005-322634

DISCLOSURE OF THE INVENTION

Problems that the Invention is to Solve

However, recent batteries are increasingly required to have higher performances, and it is desired to attain high capacity, high-temperature storability, and cycle characteristics on a high level.

As methods for obtaining a battery having an increased capacity, techniques in which an active material is packed as much as possible into a limited battery volume. For example, it has become common to employ a method in which the active-material layer of an electrode is pressed and densified or a battery is designed such that the volume of materials other than the active materials (e.g., amount of the electrolytic solution) in the battery is reduced as much as possible. However, the pressing and densification of the active-material layer of an electrode or the reduction in electrolytic-solution amount prevents the active material(s) from being evenly used. This is apt to pose a problem that uneven reactions occur to cause partial deposition of lithium or deterioration of the active materials is accelerated, making it impossible to obtain sufficient characteristics.

Furthermore, an increase in capacity results in a decrease in the internal space of the battery, and this poses a problem that in case where the electrolytic solution decomposes to evolve even a slight amount of a gas, the internal pressure of the battery undesirably rises considerably. In particular, in most cases of nonaqueous-electrolyte secondary batteries used as backup power sources in case of power outage or as the power sources of portable appliances, a slight current is always supplied thereto in order to cover the self-discharge of the batteries. These batteries are thereby always kept in a charged state. In such a battery in the state of being continuously charged, the activity of the electrode active materials is always high and, simultaneously therewith, heat generation from the appliance is apt to accelerate a decrease in battery capacity or cause decomposition of the electrolytic solution to evolve a gas. In batteries of the type in which an abnormal increase in internal pressure due to an abnormality, e.g., overcharge, is detected to make a safety valve work, there are cases where the safety valve undesirably works upon the generation of a large amount of a gas. In the case of batteries having no safety valve, there are cases where the batteries expand due to the pressure of the gas evolved and the batteries themselves become unusable.

Nonaqueous-electrolyte secondary batteries employing the electrolytic solutions described in patent documents 1 to 4 and 6 have reduced high-temperature storability in the cases described above, and have been still unsatisfactory.

Nonaqueous-electrolyte secondary batteries employing the electrolytic solution described in patent document 5 have been unsatisfactory with respect to improvement in safety during overcharge.

Means for Solving the Problems

An object of the invention, which has been achieved in view of the state of the prior-art techniques, is to provide: a nonaqueous electrolytic solution with which a nonaqueous-electrolyte battery having sufficiently enhanced safety during overcharge and further having a high capacity and excellent high-temperature storability and cycle characteristics can be realized; and a nonaqueous-electrolyte battery which employs the nonaqueous electrolytic solution, can have a reduced size, and has high performances.

The present inventors diligently made investigations in order to accomplish the object. As a result, they have found that the problems described above can be overcome by incorporating a specific compound into an electrolytic solution. The invention has been thus completed.

Namely, essential points of the invention are as shown below.

(1) A nonaqueous electrolytic solution comprising an electrolyte and a nonaqueous solvent, wherein the nonaqueous electrolytic solution comprises any of the followings (A) to (D):

(A) a nonaqueous electrolytic solution which contains a compound represented by the following general formula (1) and further contains at least one compound selected from the group consisting of cyclic carbonates having an unsaturated C=C bond, cyclic carbonates having a fluorine atom, monofluorophosphoric acid salts, and difluorophosphoric acid salts (first embodiment):

[Chem. 1]

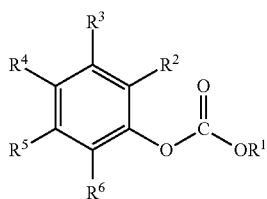

(1)

(in general formula (1), $R^1$ represents an alkyl group which has 1-12 carbon atoms and may have at least one of a halogen atom and a phenyl group, and $R^2$ to $R^6$ each independently represent a hydrogen atom or a halogen atom);

(B) a nonaqueous electrolytic solution which contains a compound represented by the following general formula (2) (second embodiment):

[Chem. 2]

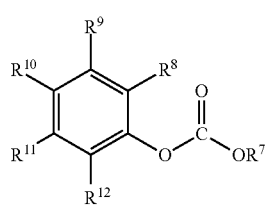

(2)

(in general formula (2), $R^7$ represents an alkyl group which has 1-12 carbon atoms and may have at least one of a halogen atom and a phenyl group, $R^8$ to $R^{12}$ each independently represent a hydrogen atom, a halogen atom, an ether group having 1-12 carbon atoms, or an alkyl group which has 1-12 carbon atoms and may have a halogen atom, and at least one of $R^8$ to $R^{12}$ is an alkyl group which has 2-12 carbon atoms and may have a halogen atom);

(C) a nonaqueous electrolytic solution which contains (a) diphenyl carbonate and (b) at least one compound selected from the group consisting of vinylene carbonate, cyclic carbonate compounds having a fluorine atom, monofluorophosphoric acid salts, and difluorophosphoric acid salts, the proportion of the (a) diphenyl carbonate to the nonaqueous electrolytic solution being 0.001% by weight or higher but less than 5% by weight, the total proportion of the at least one compound (b) selected from the group consisting of vinylene carbonate, cyclic carbonate compounds having a fluorine atom, monofluorophosphoric acid salts, and difluorophosphoric acid salts being 0.001-20% by weight, and the nonaqueous solvent comprises ethylene carbonate and a dialkyl carbonate, the proportion of the ethylene carbonate to the sum of the ethylene carbonate and the dialkyl carbonate in the nonaqueous solvent being from 5% by volume to 50% by volume (third embodiment); and (D) a nonaqueous electrolytic solution which contains at least one of phosphoric acid ester compounds and carboxylic acid ester compounds which have a phenyl group substituted by an alkyl group that may have a substituent, and the alkyl group by which the phenyl group is substituted each has 4 or more carbon atoms (fourth embodiment).

(2) The nonaqueous electrolytic solution according to (1) above, wherein the nonaqueous electrolytic solution (A) contains the compound represented by general formula (1) in a proportion to the nonaqueous electrolytic solution (A) of 0.001% by weight or higher but less than 10% by weight.

(3) The nonaqueous electrolytic solution according to (1) or (2) above, wherein the nonaqueous electrolytic solution (A) contains the at least one compound selected from the group consisting of cyclic carbonates having an unsaturated C=C bond, cyclic carbonates having a fluorine atom, monofluorophosphoric acid salts, and difluorophosphoric acid salts, in a proportion to the nonaqueous electrolytic solution (A) of from 0.001% by weight to 10% by weight.

(4) The nonaqueous electrolytic solution according to (1) above, wherein the nonaqueous electrolytic solution (B) contains at least one compound selected from the group consisting of cyclic carbonates having an unsaturated C=C bond, cyclic carbonates having a fluorine atom, monofluorophosphoric acid salts, and difluorophosphoric acid salts.

(5) The nonaqueous electrolytic solution according to (1) or (4) above, wherein the nonaqueous electrolytic solution (B) contains the compound represented by general formula (2) in a proportion to the nonaqueous electrolytic solution (B) of 0.001% by weight or higher but less than 10% by weight.

(6) The nonaqueous electrolytic solution according to (4) or (5) above, wherein the nonaqueous electrolytic solution (B) contains at least one compound selected from the group consisting of cyclic carbonates having an unsaturated C=C bond, cyclic carbonates having a fluorine atom, monofluorophosphoric acid salts, and difluorophosphoric acid salts, in a proportion to the nonaqueous electrolytic solution (B) of from 0.001% by weight to 10% by weight.

(7) The nonaqueous electrolytic solution according to any one of (1) to (3) above, wherein the nonaqueous solvent in the nonaqueous electrolytic solution (A) includes a cyclic carbonate selected from ethylene carbonate and propylene carbonate, an asymmetric chain dialkyl carbonate, and a symmetric chain dialkyl carbonate.

(8) The nonaqueous electrolytic solution according to any one of (4) to (6) above, wherein the nonaqueous solvent in the nonaqueous electrolytic solution (B) includes a cyclic carbonate selected from ethylene carbonate and propylene carbonate, an asymmetric chain dialkyl carbonate, and a symmetric chain dialkyl carbonate.

(9) The nonaqueous electrolytic solution according to (1) above, wherein in the nonaqueous electrolytic solution (D), the total proportion of the at least one of phosphoric acid ester compounds and carboxylic acid ester compounds to the nonaqueous electrolytic solution (D) is 0.001% by weight or higher but less than 10% by weight.

(10) A nonaqueous electrolytic solution comprising an electrolyte and a nonaqueous solvent, wherein the nonaqueous electrolytic solution comprises methyl phenyl carbonate and vinylene carbonate (especially preferred embodiment of nonaqueous electrolytic solution (A)).

(11) A nonaqueous electrolytic solution comprising an electrolyte and a nonaqueous solvent, wherein the nonaqueous electrolytic solution contains diphenyl carbonate and vinylene carbonate, the proportion of the diphenyl carbonate to the nonaqueous electrolytic solution being 0.001% by weight or higher but less than 5% by weight and the proportion of the vinylene carbonate to the nonaqueous electrolytic solution being 0.001-20% by weight, and the nonaqueous solvent comprises ethylene carbonate and a dialkyl carbonate, the proportion of the ethylene carbonate to the sum of the ethylene carbonate and the dialkyl carbonate in the nonaqueous solvent being from 5% by volume to 50% by volume (especially preferred embodiment of nonaqueous electrolytic solution (C)).

(12) A nonaqueous electrolytic solution comprising an electrolyte and a nonaqueous solvent, wherein the nonaqueous electrolytic solution comprises tris(4-t-butylphenyl)phosphate and vinylene carbonate (especially preferred embodiment of nonaqueous electrolytic solution (D)).

(13) A nonaqueous-electrolyte battery comprising: a negative electrode and a positive electrode which are capable of occluding and releasing lithium ions; and a nonaqueous electrolytic solution, wherein the nonaqueous electrolytic solution is the nonaqueous electrolytic solution according to any one of (1) to (12) above.

Effects of the Invention

According to the invention, a nonaqueous-electrolyte battery having sufficiently enhanced safety during overcharge and further having a high capacity and excellent high-temperature storability and cycle characteristics can be provided, and size reduction and performance advancement in nonaqueous-electrolyte batteries can be attained.

Modes for carrying out the invention will be explained below in detail. The following explanations on constituent elements are for embodiments (representative embodiments) of the invention, and the invention should not be construed as being limited to the embodiments.

[Nonaqueous Electrolytic Solution]

The nonaqueous electrolytic solution of the invention includes an electrolyte and a nonaqueous solvent containing the electrolyte dissolved therein, like ordinary nonaqueous electrolytic solutions, and usually contains these as main components.

<Electrolyte>

A lithium salt is usually used as the electrolyte. Any desired lithium salt can be used without particular limitations so long as the salt is known to be for use in this application. Examples thereof include the following.

Examples thereof include inorganic lithium salts such as $LiPF_6$ and $LiBF_4$; fluorine-containing organic lithium salts such as $LiCF_3SO_3$, $LiN(CF_3SO_2)_2$, $LiN(C_2F_5SO_2)_2$, lithium cyclic 1,2-perfluoroethane disulfonyl imide, lithium cyclic 1,3-perfluoropropane disulfonyl imide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$, lithium bis(oxalato)borate, and lithium difluoro(oxalato)borate.

Preferred of these is $LiPF_6$, $LiBF_4$, $LiCF_3SO_3$, $LiN(CF_3SO_2)_2$, or $LiN(C_2F_5SO_2)_2$ from the standpoint of improving battery performances. Especially preferred is $LiPF_6$ or $LiBF_4$.

These lithium salts may be used alone or in combination of two or more thereof.

One preferred example in the case of using two or more lithium salts is a combination of $LiPF_6$ and $LiBF_4$. This combination has the effect of improving cycle characteristics. In this case, the proportion of the $LiBF_4$ to the sum of both is as follows. The lower limit thereof is preferably 0.01% by weight or higher, more preferably 0.1% by weight or higher, especially preferably 0.2% by weight or higher, and the upper limit thereof is preferably 20% by weight or lower, more preferably 5% by weight or lower, especially preferably 3% by weight or lower. When the proportion thereof is lower than the lower limit, there are cases where the desired effect is difficult to obtain. When the proportion thereof exceeds the upper limit, there are cases where battery characteristics decrease through high-temperature storage.

Another example is a combination of an inorganic lithium salt and a fluorine-containing organic lithium salt. In this case, the proportion of the inorganic lithium salt to the sum of both is desirably from 70% by weight to 99% by weight. The fluorine-containing organic lithium salt preferably is any of $LiN(CF_3SO_2)_2$, $LiN(C_2F_5SO_2)_2$, lithium cyclic 1,2-perfluoroethane disulfonyl imide, lithium cyclic 1,3-perfluoropropane disulfonyl imide. A combination of the two has the effect of inhibiting the deterioration caused by high-temperature storage.

When the nonaqueous solvent is one containing at least 55% by volume γ-butyrolactone, it is preferred that the lithium salt(s) should be $LiBF_4$ or a combination of $LiBF_4$ and other salt(s). In this case, it is preferred that the $LiBF_4$ should account for at least 40% by mole of the lithium salts. An especially preferred combination is one in which the proportion of $LiBF_4$ to the lithium salts is from 40% by mole to 95% by mole and the remainder is one or more members selected from the group consisting of $LiPF_6$, $LiCF_3SO_3$, $LiN(CF_3SO_2)_2$ and $LiN(C_2F_5SO_2)_2$.

The concentration of these electrolytes in the nonaqueous electrolytic solution is not particularly limited from the standpoint of producing the effects of the invention. However, the concentration thereof is generally 0.5 mol/L or higher, preferably 0.6 mol/L or higher, more preferably 0.7 mol/L or higher. The upper limit thereof is generally 3 mol/L or lower, preferably 2 mol/L or lower, more preferably 1.8 mol/L or lower, even more preferably 1.5 mol/L or lower. When the concentration of the electrolytes in the nonaqueous electrolytic solution is too low, there are cases where this electrolytic solution has insufficient electrical conductivity. On the other hand, when the concentration thereof is too high, there are cases where electrical conductivity decreases due to an increase in viscosity. There also is a possibility that battery performances might decrease.

<Nonaqueous Solvent>

With respect to the nonaqueous solvent also, one suitably selected from conventionally known solvents for nonaqueous electrolytic solutions can be used. Examples thereof include cyclic carbonates having neither an unsaturated C=C bond nor a fluorine atom, chain carbonates, cyclic ethers, chain ethers, cyclic carboxylic acid esters, chain carboxylic acid esters, sulfur-containing organic solvents, and phosphorus-containing organic solvents.

Examples of the cyclic carbonates having neither an unsaturated C=C bond nor a fluorine atom include alkylene carbonates having an alkylene group with 2-4 carbon atoms, such as ethylene carbonate, propylene carbonate, and butylene carbonate. Of these, ethylene carbonate and propylene carbonate are preferred from the standpoint of improving battery characteristics. Especially preferred is ethylene carbonate.

The chain carbonates preferably are dialkyl carbonates, and the number of carbon atoms of the constituent alkyl groups is preferably 1-5, especially preferably 1-4, for each of the two alkyl groups. Specific examples thereof include dialkyl carbonates such as: symmetric chain alkyl carbonates, e.g., dimethyl carbonate, diethyl carbonate, and di-n-propyl carbonate; and asymmetric chain alkyl carbonates, e.g., ethyl methyl carbonate, methyl n-propyl carbonate, and ethyl n-propyl carbonate. Preferred of these are dimethyl carbonate, diethyl carbonate, and ethyl methyl carbonate from the standpoint of improving battery characteristics (in particular, high-load discharge characteristics).

Examples of the cyclic ethers include tetrahydrofuran and 2-methyltetrahydrofuran.

Examples of the chain ethers include dimethoxyethane and dimethoxymethane.

Examples of the cyclic carboxylic acid esters include γ-butyrolactone and γ-valerolactone.

Examples of the chain carboxylic acid esters include methyl acetate, ethyl acetate, propyl acetate, butyl acetate, methyl propionate, ethyl propionate, propyl propionate, methyl butyrate, and ethyl butyrate.

Examples of the sulfur-containing organic solvents include sulfolane, 2-methylsulfolane, 3-methylsulfolane, and diethylsulfolane.

Examples of the phosphorus-containing organic solvents include trimethyl phosphate, triethyl phosphate, dimethyl ethyl phosphate, methyl diethyl phosphate, ethylene methyl phosphate, and ethylene ethyl phosphate.

These nonaqueous solvents may be used alone or in combination of two or more thereof. It is, however, preferred to use two or more compounds in combination. For example, it is preferred to use a high-permittivity solvent, such as an alkylene carbonate or a cyclic carboxylic acid ester, and a low-viscosity solvent, such as a dialkyl carbonate or a chain carboxylic acid ester, in combination.

In the nonaqueous electrolytic solutions (A), (B), and (D), which are the first embodiment, second embodiment, and fourth embodiment of the invention, it is preferred that the nonaqueous solvent should include a cyclic carbonate selected from ethylene carbonate and propylene carbonate, an asymmetric chain dialkyl carbonate, and a symmetric chain dialkyl carbonate.

One preferred combination as the nonaqueous solvent is a combination consisting mainly of ethylene carbonate and one or more dialkyl carbonates. Especially preferred is one in which the total content of the ethylene carbonate and the dialkyl carbonate(s) in the nonaqueous solvent is 70% by volume or higher, preferably 80% by volume or higher, more preferably 90% by volume or higher, and the proportion of the ethylene carbonate to the sum of the ethylene carbonate and the dialkyl carbonate(s) is 5% by volume or higher, preferably 10% by volume or higher, more preferably 15% by volume or higher, and is 50% by volume or lower, preferably 35% by volume or lower, more preferably 30% by volume or lower, even more preferably 25% by volume or lower. A combination of these as the nonaqueous solvent is preferred because the battery produced using this combination has an improved balance between cycle characteristics and high-temperature storability (in particular, residual capacity and high-load discharge capacity after high-temperature storage).

In the nonaqueous electrolytic solution (C), which is the third embodiment of the invention, the nonaqueous solvent includes ethylene carbonate and one or more dialkyl carbonates, and the proportion of the ethylene carbonate to the sum of the ethylene carbonate and the dialkyl carbonates in the nonaqueous solvent is from 5% by volume to 50% by volume. The lower limit of the proportion of the ethylene carbonate to the sum of the ethylene carbonate and the dialkyl carbonates in the nonaqueous solvent is preferably 10% by volume or higher, more preferably 15% by volume or higher, and the upper limit thereof is preferably 35% by volume or lower, more preferably 30% by volume or lower, even more preferably 25% by volume or lower.

Examples of preferred combinations of ethylene carbonate and one or more dialkyl carbonates include: ethylene carbonate and dimethyl carbonate; ethylene carbonate and diethyl carbonate; ethylene carbonate and ethyl methyl carbonate; ethylene carbonate, dimethyl carbonate, and diethyl carbonate; ethylene carbonate, dimethyl carbonate, and ethyl methyl carbonate; ethylene carbonate, diethyl carbonate, and ethyl methyl carbonate; and ethylene carbonate, dimethyl carbonate, diethyl carbonate, and ethyl methyl carbonate.

Examples of preferred combinations further include combinations obtained by adding propylene carbonate to such combinations of ethylene carbonate and one or more dialkyl carbonates.

In the case where the nonaqueous solvent contains propylene carbonate, the volume ratio of the ethylene carbonate to the propylene carbonate is preferably from 99:1 to 40:60, especially preferably from 95:5 to 50:50. Furthermore, with respect to the proportion of the propylene carbonate to the whole nonaqueous solvent, the lower limit thereof is generally 0.1% by volume or higher, preferably 1% by volume or higher, more preferably 2% by volume or higher, and the upper limit thereof is generally 20% by volume or lower, preferably 8% by volume or lower, more preferably 5% by volume or lower. The nonaqueous solvent containing propylene carbonate in a concentration within that range is preferred because this nonaqueous solvent has excellent low-temperature properties while retaining the properties of the combination of ethylene carbonate and one or more dialkyl carbonates.

More preferred of the combinations of ethylene carbonate and one or more dialkyl carbonates are ones in which the dialkyl carbonates include an asymmetric chain alkyl carbonate. In particular, ones including ethylene carbonate, one or more symmetric chain alkyl carbonates, and one or more asymmetric chain alkyl carbonates, such as ethylene carbonate/dimethyl carbonate/ethyl methyl carbonate, ethylene carbonate/diethyl carbonate/ethyl methyl carbonate, and ethylene carbonate/dimethyl carbonate/diethyl carbonate/ethyl methyl carbonate, are preferred because these combinations have a satisfactory balance between cycle characteristics and high-current discharge characteristics. Preferred of these are ones in which the asymmetric chain alkyl carbonate is ethyl methyl carbonate. It is preferred that the alkyl groups of each alkyl carbonate should have 1-2 carbon atoms.

In the case where the nonaqueous solvent includes diethyl carbonate as a dialkyl carbonate, the proportion of the diethyl carbonate to the whole nonaqueous solvent is as follows. The lower limit thereof is generally 10% by volume or higher, preferably 20% by volume or higher, more preferably 25% by volume or higher, even more preferably 30% by volume or higher, and the upper limit thereof is generally 90% by volume or lower, preferably 80% by volume or lower, more preferably 75% by volume or lower, even more preferably 70% by volume or lower. Incorporation of diethyl carbonate in an amount within that range is preferred because this inhibits gas generation during high-temperature storage.

In the case where the nonaqueous solvent includes dimethyl carbonate as a dialkyl carbonate, the proportion of the dimethyl carbonate to the whole nonaqueous solvent is as follows. The lower limit thereof is generally 10% by volume or higher, preferably 20% by volume or higher, more preferably 25% by volume or higher, even more preferably 30% by volume or higher, and the upper limit thereof is generally 90% by volume or lower, preferably 80% by volume or lower, more preferably 75% by volume or lower, even more preferably 70% by volume or lower. Incorporation of dimethyl carbonate in an amount within that range is preferred because this improves the load characteristics of the battery.

In the case of the combination consisting mainly of ethylene carbonate and one or more dialkyl carbonates, the nonaqueous solvent may further contain other solvent(s).

In the first embodiment, second embodiment, and fourth embodiment of the invention, other preferred examples of the nonaqueous solvent are ones in which 60% by volume or more of the whole organic solvent is accounted for by one organic solvent selected from the group consisting of ethylene carbonate, propylene carbonate, γ-butyrolactone, and γ-valerolactone or by a mixed solvent composed of two or more organic solvents selected from the group. Even when the nonaqueous electrolytic solution employing this mixed solvent is used at high temperature, it is difficult to cause vaporization of the solvent or leak In particular, when either a nonaqueous solvent in which the sum of ethylene carbonate and γ-butyrolactone accounts for at least 70% by volume, preferably at least 80% by volume, more preferably at least 90% by volume, of the nonaqueous solvent and the ethylene carbonate/γ-butyrolactone volume ratio is from 5:95 to 45:55 or a nonaqueous solvent in which the sum of ethylene carbonate and propylene carbonate accounts for at least 70% by volume, preferably at least 80% by volume, more preferably at least 90% by volume, of the nonaqueous solvent and the ethylene carbonate/propylene carbonate volume ratio is from 30:70 to 60:40 is used, then a satisfactory balance among cycle characteristics, high-temperature storability, etc. is generally obtained.

In the third embodiment of the invention, other preferred examples of the nonaqueous solvent are ones in which 60% by volume or more of the whole organic solvent is accounted for by one organic solvent selected from the group consisting of ethylene carbonate, propylene carbonate, γ-butyrolactone, and γ-valerolactone or by a mixed solvent composed of two or more organic solvents selected from the group, and in which the ethylene carbonate satisfies that the proportion of the ethylene carbonate to the sum of the ethylene carbonate and dialkyl carbonate(s) in the nonaqueous solvent is from 5% by volume to 50% by volume. Even when the nonaqueous electrolytic solution employing this mixed solvent is used at high temperature, it is difficult to cause vaporization of the solvent or leak. In particular, when either a nonaqueous solvent in which the sum of ethylene carbonate and γ-butyrolactone accounts for at least 70% by volume, preferably at least 80% by volume, more preferably at least 90% by volume, of the nonaqueous solvent and the ethylene carbonate/γ-butyrolactone volume ratio is from 5:95 to 45:55 or a nonaqueous solvent in which the sum of ethylene carbonate and propylene carbonate accounts for at least 70% by volume, preferably at least 80% by volume, more preferably at least 90% by volume, of the nonaqueous solvent and the ethylene carbonate/propylene carbonate volume ratio is from 30:70 to 60:40 is used, then a satisfactory balance among cycle characteristics, high-temperature storability, etc. is generally obtained.

In this description, the volume of a nonaqueous solvent is a value measured at 25° C. However, with respect to solvents which are solid at 25° C., e.g., ethylene carbonate, values measured at the melting points are used.

First Embodiment of the Invention

The nonaqueous electrolytic solution (A) according to the first embodiment of the invention, which includes the electrolyte and nonaqueous solvent described above, is characterized by containing a compound represented by the following general formula (1) and further containing at least one compound selected from the group consisting of cyclic carbonates having an unsaturated C=C bond, cyclic carbonates having a fluorine atom, monofluorophosphoric acid salts, and difluorophosphoric acid salts.

[Chem. 3]

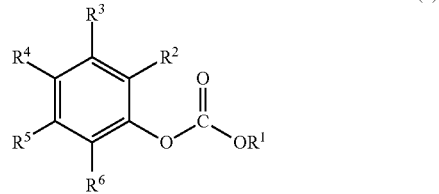

(1)

(In general formula (1), $R^1$ represents an alkyl group which has 1-12 carbon atoms and may have at least one of halogen atoms and a phenyl group, and $R^2$ to $R^6$ each independently represent a hydrogen atom or a halogen atom.)

(Compound Represented by General Formula (1))

The compound represented by general formula (1) is explained in detail.

With respect to the number of carbon atoms of the alkyl group represented by $R^1$, the lower limit thereof is generally 1 or larger from the standpoints of improvement in safety during overcharge and battery characteristics. The upper limit thereof is generally 12 or smaller, preferably 8 or smaller, more preferably 6 or smaller, from the standpoints of improvement in safety during overcharge, battery characteristics, and solubility in the electrolytic solution.

Examples of the halogen atoms which may substitute any hydrogen atom in the alkyl group represented by $R^1$ include a fluorine atom, chlorine atom, and bromine atom. Of these, a fluorine atom is preferred from the standpoint of battery characteristics.

Examples of the alkyl group having 1-12 carbon atoms which is represented by $R^1$ include methyl, ethyl, n-propyl, isopropyl, n-butyl, isobutyl, sec-butyl, t-butyl, n-pentyl, t-amyl, 1,1-dimethylbutyl, cyclobutyl, cyclopentyl, cyclohexyl, 1-methylcyclohexyl, and 1-ethylcyclohexyl.

In these alkyl groups, part or all of the hydrogen atoms may have been replaced by fluorine atoms and/or phenyl groups.

$R^2$ to $R^6$ represent a hydrogen atom or a halogen atom. It is preferred that $R^2$ to $R^6$ should be hydrogen atoms, among those, from the standpoints of improvement in safety during overcharge and battery characteristics.

Examples of the halogen atom represented by $R^2$ to $R^6$ include a fluorine atom, chlorine atom, and bromine atom. Of these, a fluorine atom is preferred from the standpoint of battery characteristics.

Examples of the compound represented by general formula (1) include the following.
Methyl phenyl carbonate,
ethyl phenyl carbonate,
n-propyl phenyl carbonate,
isopropyl phenyl carbonate,
n-butyl phenyl carbonate,
isobutyl phenyl carbonate,
sec-butyl phenyl carbonate,
t-butyl phenyl carbonate,
n-pentyl phenyl carbonate,
t-amyl phenyl carbonate,
(1,1-dimethylbutyl)phenyl carbonate,
cyclobutyl phenyl carbonate,
cyclopentyl phenyl carbonate,
cyclohexyl phenyl carbonate,
(2-methylcyclohexyl)phenyl carbonate,
(2-ethylcyclohexyl)phenyl carbonate,
fluoromethyl phenyl carbonate,
(1-fluoroethyl)phenyl carbonate,
(1,1-difluoroethyl)phenyl carbonate,
(1,2-difluoroethyl)phenyl carbonate,
(2,2-difluoroethyl)phenyl carbonate,
(2-fluorocyclopentyl)phenyl carbonate,
(2,3-difluorocyclopentyl)phenyl carbonate,
(2-fluorophenyl)methyl carbonate,
ethyl(2-fluorophenyl)carbonate,
(2-fluorophenyl)n-propyl carbonate,
(2-fluorophenyl)isopropyl carbonate,
n-butyl(2-fluorophenyl)carbonate,
isobutyl(2-fluorophenyl)carbonate,
sec-butyl(2-fluorophenyl)carbonate,
t-butyl(2-fluorophenyl)carbonate,
(2-fluorophenyl)n-pentyl carbonate,
t-amyl(2-fluorophenyl)carbonate,
(2-fluorophenyl)(1,1-dimethylbutyl)carbonate,
(3-fluorophenyl)methyl carbonate,
ethyl(3-fluorophenyl)carbonate,
(3-fluorophenyl)n-propyl carbonate,
(3-fluorophenyl)isopropyl carbonate,
n-butyl(3-fluorophenyl)carbonate,
isobutyl(3-fluorophenyl)carbonate,
sec-butyl(3-fluorophenyl)carbonate,
t-butyl(3-fluorophenyl)carbonate,
(3-fluorophenyl)n-pentyl carbonate,
t-amyl(3-fluorophenyl)carbonate,
(3-fluorophenyl)(1,1-dimethylbutyl)carbonate,
(4-fluorophenyl)methyl carbonate,
ethyl(4-fluorophenyl)carbonate,
(4-fluorophenyl)n-propyl carbonate,
(4-fluorophenyl)isopropyl carbonate,
n-butyl(4-fluorophenyl)carbonate,
isobutyl(4-fluorophenyl)carbonate,
sec-butyl(4-fluorophenyl)carbonate,
t-butyl(4-fluorophenyl)carbonate
(4-fluorophenyl)n-pentyl carbonate,
t-amyl(4-fluorophenyl)carbonate,
(4-fluorophenyl)(1,1-dimethylbutyl)carbonate,
(3,5-difluorophenyl)methyl carbonate,
ethyl(3,5-difluorophenyl)carbonate,
(3,5-difluorophenyl)n-propyl carbonate,
(3,5-difluorophenyl)isopropyl carbonate,
n-butyl(3,5-difluorophenyl)carbonate,
isobutyl(3,5-difluorophenyl)carbonate,
sec-butyl(3,5-difluorophenyl)carbonate,
t-butyl(3,5-difluorophenyl)carbonate,
(3,5-difluorophenyl)n-pentyl carbonate,
t-amyl(3,5-difluorophenyl)carbonate,
(3,5-difluorophenyl)(1,1-dimethylbutyl)carbonate,
(2,4,6-trifluorophenyl)methyl carbonate,
ethyl(2,4,6-trifluorophenyl)carbonate,
(2,4,6-trifluorophenyl)n-propyl carbonate,
(2,4,6-trifluorophenyl)isopropyl carbonate,
n-butyl(2,4,6-trifluorophenyl)carbonate,
isobutyl(2,4,6-trifluorophenyl)carbonate,
sec-butyl(2,4,6-trifluorophenyl)carbonate,
t-butyl(2,4,6-trifluorophenyl)carbonate,
(2,4,6-trifluorophenyl)n-pentyl carbonate,
t-amyl(2,4,6-trifluorophenyl)carbonate, and
(2,4,6-trifluorophenyl)(1,1-dimethylbutyl)carbonate.

Of these, the compounds in which $R^2$ to $R^6$ are hydrogen atoms are preferred from the standpoints of improvement in safety during overcharge and battery characteristics. More preferred are
methyl phenyl carbonate,
ethyl phenyl carbonate,
n-propyl phenyl carbonate,
isopropyl phenyl carbonate,
n-butyl phenyl carbonate,
isobutyl phenyl carbonate,
sec-butyl phenyl carbonate,
t-butyl phenyl carbonate,
n-pentyl phenyl carbonate,
t-amyl phenyl carbonate,
(1,1-dimethylbutyl)phenyl carbonate,
cyclobutyl phenyl carbonate,
cyclopentyl phenyl carbonate,
cyclohexyl phenyl carbonate,
(2-methylcyclohexyl)phenyl carbonate,
(2-ethylcyclohexyl)phenyl carbonate,
fluoromethyl phenyl carbonate,
(1-fluoroethyl)phenyl carbonate,
(1,1-difluoroethyl)phenyl carbonate,
(1,2-difluoroethyl)phenyl carbonate,
(2,2-difluoroethyl)phenyl carbonate,
(2-fluorocyclopentyl)phenyl carbonate, and
(2,3-difluorocyclopentyl)phenyl carbonate.
Even more preferred are
methyl phenyl carbonate,
ethyl phenyl carbonate,
n-propyl phenyl carbonate,
isopropyl phenyl carbonate,
n-butyl phenyl carbonate,
isobutyl phenyl carbonate,
sec-butyl phenyl carbonate,
t-butyl phenyl carbonate,
n-pentyl phenyl carbonate,
t-amyl phenyl carbonate, and
(1,1-dimethylbutyl)phenyl carbonate.
Especially preferred are
methyl phenyl carbonate,
ethyl phenyl carbonate, n-propyl phenyl carbonate, and
n-butyl phenyl carbonate.

The proportion of the compound represented by general formula (1) in the nonaqueous electrolytic solution is generally 0.001% by weight or higher, preferably 0.01% by weight or higher, more preferably 0.05% by weight or higher, especially preferably 0.1% by weight or higher. When the concentration thereof is lower than that, there are cases where the effects of the invention may be hardly produced. Conversely, too high concentrations may result in a decrease in battery capacity. Consequently, the upper limit thereof is generally lower than 10% by weight, preferably 5% by weight or lower, more preferably 3% by weight or lower, especially preferably 2% by weight or lower, most preferably 1.5% by weight or lower.

(Cyclic Carbonates Having Unsaturated C=C Bond, Cyclic Carbonates Having Fluorine Atom, Monofluorophosphoric Acid Salts, and Difluorophosphoric Acid Salts)

The nonaqueous electrolytic solution of the invention which contains at least one of cyclic carbonates having an unsaturated C=C bond, cyclic carbonates having a fluorine atom, monofluorophosphoric acid salts, and difluorophosphoric acid salts can improve the cycle characteristics and high-temperature storability of the battery because these additives form a stable protective coating film on the surface of the negative electrode.

The content of those compounds in the nonaqueous electrolytic solution is generally 0.001% by weight or higher, preferably 0.01% by weight or higher, more preferably 0.1% by weight or higher, especially preferably 0.3% by weight or higher, most preferably 0.5% by weight or higher.

When the content thereof is higher than the lower limit, it is possible to improve, in particular, the cycle characteristics and high-temperature storability of the battery. When the content thereof is lower than the upper limit, gas evolution during high-temperature storage can be prevented from occurring in a large amount and discharge characteristics can be prevented from decreasing at low temperatures. Consequently, the upper limit thereof is generally 10% by weight or lower, preferably 5% by weight or lower, more preferably 3% by weight or lower, especially preferably 2% by weight or lower.

The cyclic carbonates having a fluorine atom produce different effects according to the content thereof. In the case where a cyclic carbonate having a fluorine atom is used as an additive, i.e., when the cyclic carbonate is used so as to result in a content thereof of from 0.001% by weight to 10% by weight, then the effects of the invention described above are produced. In the case where a cyclic carbonate having a fluorine atom is used as a nonaqueous solvent in place of an alkylene carbonate having 2-4 carbon atoms used as the nonaqueous solvent described above, i.e., when the cyclic carbonate is used in an amount exceeding 10% by weight, then storability during high-voltage use is especially improved besides those effects of the invention are produced.

<Cyclic Carbonates Having Unsaturated C=C Bond>

Examples of the cyclic carbonates having an unsaturated C=C bond include vinylene carbonate compounds such as vinylene carbonate, methylvinylene carbonate, ethylvinylene carbonate, 4,5-dimethylvinylene carbonate, 4,5-diethylvinylene carbonate, fluorovinylene carbonate, and trifluoromethylvinylene carbonate; vinylethylene carbonates such as vinylethylene carbonate, 4-methyl-4-vinylethylene carbonate, 4-ethyl-4-vinylethylene carbonate, 4-n-propyl-4-vinylethylene carbonate, 5-methyl-4-vinylethylene carbonate, 4,4-divinylethylene carbonate, and 4,5-divinyl ethylene carbonate; and methyleneethylene carbonates such as 4,4-dimethyl-5-methyleneethylene carbonate and 4,4-diethyl-5-methyleneethylene carbonate.

Preferred of these from the standpoints of improving cycle characteristics and improving high-temperature storability is vinylene carbonate, vinylethylene carbonate, 4-methyl-4-vinylethylene carbonate, or 4,5-divinylethylene carbonate. More preferred of these is vinylene carbonate or vinylethylene carbonate. Especially preferred is vinylene carbonate.

Those cyclic carbonates may be used alone or in combination of two or more thereof. When two or more are used in combination, it is preferred to use a combination of vinylene carbonate and vinylethylene carbonate.

<Cyclic Carbonates Having Fluorine Atom>

Examples of the cyclic carbonate compounds having a fluorine atom include fluoroethylene carbonate, 4,5-difluoroethylene carbonate, 4,4-difluoroethylene carbonate, 4,4,5-trifluoroethylene carbonate, 4,4,5,5-tetrafluoroethylene carbonate, 4-fluoro-5-methylethylene carbonate, 4-fluoro-4-methylethylene carbonate, 4,5-difluoro-4-methylethylene carbonate, 4,4,5-trifluoro-5-methylethylene carbonate, and trifluoromethylethylene carbonate.

Preferred of these from the standpoints of improving cycle characteristics and improving high-temperature storability are fluoroethylene carbonate, 4,5-difluoroethylene carbonate, and 4-fluoro-5-methylethylene carbonate.

Those cyclic carbonates may be used alone or in combination of two or more thereof. When two or more are used in combination, it is preferred to use a combination of fluoroethylene carbonate and 4,5-difluoroethylene carbonate.

Such a cyclic carbonate having a fluorine atom may be used in combination with a cyclic carbonate having an unsaturated C=C bond. From the standpoints of improving cycle characteristics and improving high-temperature storability, it is preferred to use the carbonate in combination with vinylene carbonate or vinylethylene carbonate.

<Monofluorophosphoric Acid Salts and Difluorophosphoric Acid Salts>

The counter cations of the monofluorophosphoric acid salts and difluorophosphoric acid salts are not particularly limited. Examples thereof include metallic elements such as Li, Na, K, Mg, Ca, Fe, and Cu, and further include ammoniums represented by $NR^{13}R^{14}R^{15}R^{16}$ (wherein $R^{13}$ to $R^{16}$ each independently represent a hydrogen atom or an organic group having 1-12 carbon atoms) and quaternary ammoniums. Examples of the organic group having 1-12 carbon atoms which is represented by $R^{13}$ to $R^{16}$ include alkyl groups which may be substituted by halogen atoms, cycloalkyl groups which may be substituted by halogen atoms, aryl groups which may be substituted by halogen atoms, and nitrogen-atom-containing heterocyclic groups. $R^{13}$ to $R^{16}$ each preferably are a hydrogen atom, an alkyl group, a cycloalkyl group, a nitrogen-atom-containing heterocyclic group, or the like. Preferred of these counter cations is lithium, sodium, potassium, magnesium, calcium, or $NR^{13}R^{14}R^{15}R^{16}$ from the standpoint of the battery characteristics of the lithium secondary battery employing the electrolytic solution. Especially preferred is lithium.

Examples of the monofluorophosphoric acid salts and difluorophosphoric acid salts include lithium monofluorophosphate, lithium difluorophosphate, sodium monofluorophosphate, sodium difluorophosphate, potassium monofluorophosphate, and potassium difluorophosphate. Preferred of these are lithium monofluorophosphate and lithium difluorophosphate from the standpoints of improving low-temperature discharge characteristics, improving battery cycle characteristics, and high-temperature storability. More preferred is lithium difluorophosphate.

Those salts may be used alone or in combination of two or more thereof.

Such a salt may also be used in combination with a cyclic carbonate having an unsaturated C=C bond. From the standpoints of improving cycle characteristics and improving high-temperature storability, it is preferred to use such a salt in combination with vinylene carbonate or vinylethylene carbonate. The salt may also be used in combination with a cyclic carbonate compound having a fluorine atom, and this cyclic carbonate compound preferably is fluoroethylene carbonate from the standpoints of improving cycle characteristics and improving high-temperature storability.

The cyclic carbonates having an unsaturated C=C bond, cyclic carbonates having a fluorine atom, monofluorophosphoric acid salts, and difluorophosphoric acid salts may be used alone or in combination of two or more thereof.

The reason why the nonaqueous electrolytic solution (A) as the first embodiment of the invention attains excellent safety during overcharge and further attains excellent high-temperature storability is unclear. However, the reason is presumed to be as follows, although the invention should not be construed as being limited by the following mechanism.

The compound represented by general formula (1) is more apt to react on the electrodes than solvent ingredients and, hence, may undesirably react at highly active areas in the electrodes during high-temperature storage to reduce battery characteristics through the high-temperature storage. It is, however, thought that by using the compound in combination with the cyclic carbonate having an unsaturated C=C bond, cyclic carbonate having a fluorine atom, monofluorophosphoric acid salt, and difluorophosphoric acid salt, which form a stable protective coating film on the surface of the negative electrode, the cycle characteristics and discharge characteristics during high-temperature storage of the battery can be improved because these compounds form a stable protective coating film on the surface of the negative electrode. It is also thought that the cyclic carbonate having an unsaturated C=C bond, cyclic carbonate having a fluorine atom, monofluorophosphoric acid salt, and difluorophosphoric acid salt, when used in combination with the compound represented by general formula (1), can accelerate reactions during overcharge and can thereby enhance safety during overcharge as compared with the case where the compound represented by general formula (1) is used alone.

Second Embodiment of the Invention

The nonaqueous electrolytic solution (B) according to the second embodiment of the invention, which includes the electrolyte and nonaqueous solvent described above, is characterized by further containing a compound represented by the following general formula (2).

[Chem. 4]

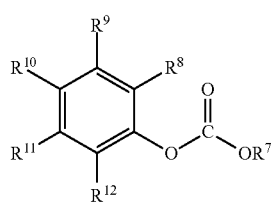

(2)

(In general formula (2), $R^7$ represents an alkyl group which has 1-12 carbon atoms and may have at least one of halogen atoms and a phenyl group, and $R^8$ to $R^{12}$ each independently represent a hydrogen atom, a halogen atom, an ether group having 1-12 carbon atoms, or an alkyl group which has 1-12 carbon atoms and may have a halogen atom, at least one of $R^8$ to $R^{12}$ being an alkyl group which has 2-12 carbon atoms and may have a halogen atom.)

(Compound Represented by General Formula (2))

The compound represented by general formula (2) is explained in detail.

With respect to the number of carbon atoms of the alkyl group represented by $R^7$, the lower limit thereof is generally 1 or larger from the standpoints of improvement in safety during overcharge and battery characteristics. The upper limit thereof is generally 12 or smaller, preferably 8 or smaller, more preferably 6 or smaller, from the standpoints of improvement in safety during overcharge, battery characteristics, and solubility in the electrolytic solution.

Examples of the halogen atoms which may substitute any hydrogen atom in the alkyl group represented by $R^7$ include a fluorine atom, chlorine atom, and bromine atom. Of these, a fluorine atom is preferred from the standpoint of battery characteristics.

Examples of the alkyl group having 1-12 carbon atoms which is represented by $R^7$ include methyl, ethyl, n-propyl, isopropyl, n-butyl, isobutyl, sec-butyl, t-butyl, n-pentyl, t-amyl, 1,1-dimethylbutyl, cyclobutyl, cyclopentyl, cyclohexyl, 1-methylcyclohexyl, and 1-ethylcyclohexyl.

In these alkyl groups, part or all of the hydrogen atoms may have been replaced by halogen atoms (preferably fluorine atoms).

$R^8$ to $R^{12}$ represent a hydrogen atom, a halogen atom, an ether group having 1-12 carbon atoms, or an alkyl group which has 1-12 carbon atoms and may have a halogen atom. From the standpoints of safety during overcharge and high-temperature storability, $R^8$ to $R^{12}$ each preferably are a hydrogen atom or an alkyl which has 1-12 carbon atoms and may have a halogen atom, among those atoms and groups, and especially preferably are a secondary alkyl group or a tertiary alkyl group.

Examples of the halogen atom represented by $R^8$ to $R^{12}$ include a fluorine atom, chlorine atom, and bromine atom. Of these, a fluorine atom is preferred from the standpoint of battery characteristics.

Examples of the alkyl group having 1-12 carbon atoms which is represented by $R^8$ to $R^{12}$ include methyl, ethyl, n-propyl, isopropyl, n-butyl, isobutyl, sec-butyl, t-butyl, n-pentyl, t-amyl, 1,1-dimethylbutyl, cyclobutyl, cyclopentyl, cyclohexyl, 1-methylcyclohexyl, and 1-ethylcyclohexyl.

In these alkyl groups, part or all of the hydrogen atoms may have been replaced by halogen atoms (preferably fluorine atoms).

However, at least one of $R^8$ to $R^{12}$ in general formula (2) is an alkyl group which has 2-12 carbon atoms and may have a halogen atom.

From the standpoints of safety during overcharge and high-temperature storability, $R^8$ to $R^{12}$ each preferably are a secondary alkyl group or a tertiary alkyl group. Preferred of such alkyl groups are sec-butyl, t-butyl, t-amyl, 1,1-dimethylbutyl, cyclopentyl, cyclohexyl, 1-methylcyclohexyl, and 1-ethylcyclohexyl. Especially preferred are t-butyl, t-amyl, 1,1-dimethylbutyl, cyclopentyl, cyclohexyl, 1-methylcyclohexyl, and 1-ethylcyclohexyl.

In these alkyl groups, part or all of the hydrogen atoms may have been replaced by halogen atoms (preferably fluorine atoms).

Examples of the compound represented by general formula (2) include the following.
(2-t-Butylphenyl)methyl carbonate,
(2-t-butylphenyl)ethyl carbonate,
(2-t-butylphenyl)n-propyl carbonate, (2-t-butylphenyl)isopropyl carbonate,
n-butyl(2-t-butylphenyl)carbonate,
isobutyl(2-t-butylphenyl)carbonate,
sec-butyl(2-t-butylphenyl)carbonate,
t-butyl(2-t-butylphenyl)carbonate,
(2-t-butylphenyl)n-pentyl carbonate,
t-amyl(2-t-butylphenyl)carbonate,
(2-t-butylphenyl)(1,1-dimethylbutyl)carbonate,
(2-t-butylphenyl)cyclobutyl carbonate,
(2-t-butylphenyl)cyclopentyl carbonate,
(2-t-butylphenyl)cyclohexyl carbonate,
(2-t-butylphenyl)(2-methylcyclohexyl)carbonate,
(2-t-butylphenyl)(2-ethylcyclohexyl)carbonate,
(2-t-butylphenyl)fluoromethyl carbonate,
(2-t-butylphenyl)(1-fluoroethyl)carbonate,
(2-t-butylphenyl)(1,1-difluoroethyl)carbonate,
(2-t-butylphenyl)(1,2-difluoroethyl)carbonate,
(2-t-butylphenyl)(2,2-difluoroethyl)carbonate,
(2-t-butylphenyl)(2-fluorocyclopentyl)carbonate,
(2-t-butylphenyl)(2,3-difluorocyclopentyl)carbonate,
(2-t-butylphenyl)phenylmethyl carbonate,
(2-t-butylphenyl)(1-phenylethyl)carbonate,
(3-t-butylphenyl)methyl carbonate,
(3-t-butylphenyl)ethyl carbonate,
(3-t-butylphenyl)n-propyl carbonate,
(3-t-butylphenyl)isopropyl carbonate,
n-butyl(3-t-butylphenyl)carbonate,
isobutyl(3-t-butylphenyl)carbonate,
sec-butyl(3-t-butylphenyl)carbonate,
t-butyl(3-t-butylphenyl)carbonate,
(3-t-butylphenyl)n-pentyl carbonate,
t-amyl(3-t-butylphenyl)carbonate,
(3-t-butylphenyl)(1,1-dimethylbutyl)carbonate,
(3-t-butylphenyl)fluoromethyl carbonate,
(3-t-butylphenyl)(1-fluoroethyl)carbonate,
(3-t-butylphenyl)(1,1-difluoroethyl)carbonate,
(3-t-butylphenyl)(1,2-difluoroethyl)carbonate,
(3-t-butylphenyl)phenylmethyl carbonate,
(3-t-butylphenyl)(1-phenylethyl)carbonate,
(4-t-butylphenyl)methyl carbonate,
(4-t-butylphenyl)ethyl carbonate,
(4-t-butylphenyl)n-propyl carbonate,
(4-t-butylphenyl)isopropyl carbonate,
n-butyl(4-t-butylphenyl)carbonate,
isobutyl(4-t-butylphenyl)carbonate,
sec-butyl(4-t-butylphenyl)carbonate,
t-butyl(4-t-butylphenyl)carbonate,
(4-t-butylphenyl)n-pentyl carbonate,
t-amyl(4-t-butylphenyl)carbonate,
(4-t-butylphenyl)(1,1-dimethylbutyl)carbonate,
(4-t-butylphenyl)fluoromethyl carbonate,
(4-t-butylphenyl)(1-fluoroethyl)carbonate,
(4-t-butylphenyl)(1,1-difluoroethyl)carbonate,
(4-t-butylphenyl)(1,2-difluoroethyl)carbonate,
(4-t-butylphenyl)phenylmethyl carbonate,
(4-t-butylphenyl)(1-phenylethyl)carbonate,
(3,5-di-t-butylphenyl)methyl carbonate,
(3,5-di-t-butylphenyl)ethyl carbonate,
(3,5-di-t-butylphenyl)n-propyl carbonate,
(3,5-di-t-butylphenyl)isopropyl carbonate,
n-butyl(3,5-di-t-butylphenyl)carbonate,
isobutyl(3,5-di-t-butylphenyl)carbonate,
sec-butyl(3,5-di-t-butylphenyl)carbonate,
t-butyl(3,5-di-t-butylphenyl)carbonate,
(3,5-di-t-butylphenyl)n-pentyl carbonate,
t-amyl(3,5-di-t-butylphenyl)carbonate,
(3,5-di-t-butylphenyl)(1,1-dimethylbutyl)carbonate,
(3,5-di-t-butylphenyl)fluoromethyl carbonate,
(3,5-di-t-butylphenyl)(1-fluoroethyl)carbonate,
(3,5-di-t-butylphenyl)(1,1-difluoroethyl)carbonate,
(3,5-di-t-butylphenyl)(1,2-difluoroethyl)carbonate,
(3,5-di-t-butylphenyl)phenylmethyl carbonate,
(3,5-di-t-butylphenyl)(1-phenylethyl)carbonate,
(2,4,5-tri-t-butylphenyl)methyl carbonate,
(2,4,5-tri-t-butylphenyl)ethyl carbonate,
(2,4,5-tri-t-butylphenyl)n-propyl carbonate,
(2,4,5-tri-t-butylphenyl)isopropyl carbonate,
n-butyl(2,4,5-tri-t-butylphenyl)carbonate,
isobutyl(2,4,5-tri-t-butylphenyl)carbonate,
sec-butyl(2,4,5-tri-t-butylphenyl)carbonate,
t-butyl(2,4,5-tri-t-butylphenyl)carbonate,
(2,4,5-tri-t-butylphenyl)n-pentyl carbonate,
t-amyl(2,4,5-tri-t-butylphenyl)carbonate,
(2,4,5-tri-t-butylphenyl)(1,1-dimethylbutyl)carbonate,
(2,4,5-tri-t-butylphenyl)fluoromethyl carbonate,
(2,4,5-tri-t-butylphenyl)(1-fluoroethyl)carbonate,
(2,4,5-tri-t-butylphenyl)(1,1-difluoroethyl)carbonate,
(2,4,5-tri-t-butylphenyl)(1,2-difluoroethyl)carbonate,
(2,4,5-tri-t-butylphenyl)phenylmethyl carbonate,
(2,4,5-tri-t-butylphenyl)(1-phenylethyl)carbonate,
(2-cyclohexylphenyl)methyl carbonate,
(2-cyclohexylphenyl)ethyl carbonate,
(2-cyclohexylphenyl)n-propyl carbonate,
(2-cyclohexylphenyl)isopropyl carbonate,
n-butyl(2-cyclohexylphenyl)carbonate,
isobutyl(2-cyclohexylphenyl)carbonate,
sec-butyl(2-cyclohexylphenyl)carbonate,
t-butyl(2-cyclohexylphenyl)carbonate,
(2-cyclohexylphenyl)n-pentyl carbonate,
t-amyl(2-cyclohexylphenyl)carbonate,
(2-cyclohexylphenyl)(1,1-dimethylbutyl)carbonate,
(3-cyclohexylphenyl)methyl carbonate,
(3-cyclohexylphenyl)ethyl carbonate,
(4-cyclohexylphenyl)methyl carbonate,
(4-cyclohexylphenyl)ethyl carbonate,
(2-ethylphenyl)methyl carbonate,
(3-ethylphenyl)methyl carbonate,
(4-ethylphenyl)methyl carbonate,
ethyl(4-ethylphenyl)carbonate,
t-butyl(4-ethylphenyl)carbonate,
t-amyl(4-ethylphenyl)carbonate,
cyclobutyl(4-ethylphenyl)carbonate,
cyclopentyl(4-ethylphenyl)carbonate,
cyclohexyl(4-ethylphenyl)carbonate,
(4-ethylphenyl)fluoromethyl carbonate,
(4-ethylphenyl)(1-fluoroethyl)carbonate,
(4-ethylphenyl)(1,2-difluoroethyl)carbonate,
(4-ethylphenyl)(2-fluorocyclopentyl)carbonate,
(4-ethylphenyl)(2,3-difluorocyclopentyl)carbonate,
(4-ethylphenyl)phenylmethyl carbonate,
(4-ethylphenyl)(1-phenylethyl)carbonate,
(3-t-butyl-5-fluorophenyl)methyl carbonate,
(3-t-butyl-5-fluorophenyl)ethyl carbonate,
t-butyl(3-t-butyl-5-fluorophenyl)carbonate,
t-amyl(3-t-butyl-5-fluorophenyl)carbonate,
(3-t-butyl-5-fluorophenyl)cyclobutyl carbonate,
(3-t-butyl-5-fluorophenyl)cyclopentyl carbonate,
(3-t-butyl-5-fluorophenyl)cyclohexyl carbonate,
(3-t-butyl-5-fluorophenyl)fluoromethyl carbonate,
(3-t-butyl-5-fluorophenyl)(1-fluoroethyl)carbonate,
(3-t-butyl-5-fluorophenyl)(1,2-difluoroethyl)carbonate,
(3-t-butyl-5-fluorophenyl)(2-fluorocyclopentyl)carbonate,
(3-t-butyl-5-fluorophenyl)carbonate(2,3-difluorocyclopentyl), (3-t-butyl-5-methoxyphenyl)methyl carbonate,
(3-t-butyl-5-methoxyphenyl)ethyl carbonate,
t-butyl(3-t-butyl-5-methoxyphenyl)carbonate,
t-amyl(3-t-butyl-5-methoxyphenyl)carbonate,
(3-t-butyl-5-methoxyphenyl)cyclobutyl carbonate,
(3-t-butyl-5-methoxyphenyl)cyclopentyl carbonate,
(3-t-butyl-5-methoxyphenyl)cyclohexyl carbonate,
(3-t-butyl-5-methoxyphenyl)fluoromethyl carbonate,
(3-t-butyl-5-methoxyphenyl)(1-fluoroethyl)carbonate,
(3-t-butyl-5-methoxyphenyl)(1,2-difluoroethyl)carbonate,
(3-t-butyl-5-methoxyphenyl)(2-fluorocyclopentyl)carbonate, and
(3-t-butyl-5-methoxyphenyl)(2,3-difluorocyclopentyl)carbonate.

Of these, the compounds in which $R^8$ to $R^{12}$ are secondary alkyl groups or tertiary alkyl groups are preferred from the standpoints of safety during overcharge and battery characteristics. More preferred are
(2-t-butylphenyl)methyl carbonate,
(2-t-butylphenyl)ethyl carbonate,
(3-t-butylphenyl)methyl carbonate,
(3-t-butylphenyl)ethyl carbonate,
(4-t-butylphenyl)methyl carbonate,
(4-t-butylphenyl)ethyl carbonate,
(3,5-di-t-butylphenyl)methyl carbonate,
(3,5-di-t-butylphenyl)ethyl carbonate,
methyl(2,4,5-tri-t-butylphenyl)carbonate,
ethyl(2,4,5-tri-t-butylphenyl)carbonate,
(2-cyclohexylphenyl)methyl carbonate,
(2-cyclohexylphenyl)ethyl carbonate,
(3-cyclohexylphenyl)methyl carbonate,
(3-cyclohexylphenyl)ethyl carbonate,
(4-cyclohexylphenyl)methyl carbonate, and
(4-cyclohexylphenyl)ethyl carbonate.

The proportion of the compound represented by general formula (2) in the nonaqueous electrolytic solution is generally 0.001% by weight or higher, preferably 0.01% by weight or higher, more preferably 0.05% by weight or higher, especially preferably 0.1% by weight or higher. When the concentration thereof is lower than that, there are cases where the effects of the invention may be hardly produced. Conversely, too high concentrations may result in a decrease in battery capacity. Consequently, the upper limit thereof is generally lower than 10% by weight, preferably 5% by weight or lower, more preferably 3% by weight or lower, especially preferably 2% by weight or lower, most preferably 1.5% by weight or lower.

The nonaqueous electrolytic solution characterized by containing a compound represented by general formula (2) in the invention preferably further contains at least one compound selected from the group consisting of cyclic carbonates having an unsaturated C=C bond, cyclic carbonates having a fluorine atom, monofluorophosphoric acid salts, and difluorophosphoric acid salts described above. The cyclic carbonates having an unsaturated C=C bond, cyclic carbonates having a fluorine atom, monofluorophosphoric acid salts, and difluorophosphoric acid salts may be used alone or in combination of two or more thereof. Detailed explanation on these compounds are as given above.

The reason why this nonaqueous electrolytic solution according to the invention attains excellent safety during overcharge and further attains excellent high-temperature storability is unclear. However, the reason is presumed to be as follows, although the invention should not be construed as being limited by the following mechanism.

In general, the electron-donating properties of alkyl groups are enhanced as the number of carbon atoms of the alkyl groups increases. Furthermore, secondary alkyl groups and tertiary alkyl groups have higher electron-donating properties than primary alkyl groups. Consequently, compared to carbonate compounds having a phenyl group substituted by the alkyl group having one carbon atom, carbonate compounds having a phenyl group substituted by an alkyl group having 2 or more carbon atoms have a lower oxidation potential and can react in an earlier stage in the case of overcharge and thereby enhance safety during overcharge. Usually, compounds having a low oxidation potential react at highly active areas in the electrodes even during high-temperature storage to reduce battery characteristics through the high-temperature storage. It is, however, thought that since the compound represented by general formula (2) has a phenyl group substituted by an alkyl group having 2 or more carbon atoms, the side reactions occurring during high-temperature storage are inhibited due to the steric hindrance caused by the alkyl group and discharge characteristics are inhibited from considerably decreasing through high-temperature storage.

Third Embodiment of the Invention

The nonaqueous electrolytic solution (C) according to the third embodiment of the invention, which includes an electrolyte and a nonaqueous solvent, is characterized in that the nonaqueous electrolytic solution (C) further contains (a) diphenyl carbonate and (b) at least one compound selected from the group consisting of vinylene carbonate, cyclic carbonate compounds having a fluorine atom, monofluorophosphoric acid salts, and difluorophosphoric acid salts (hereinafter often referred to as "compound (b)"), the proportion of the (a) diphenyl carbonate to the nonaqueous electrolytic solution being 0.001% by weight or higher but less than 5% by weight, the total proportion of compound (b) being 0.001-20% by weight, and that the nonaqueous solvent comprises ethylene carbonate and a dialkyl carbonate, the proportion of the ethylene carbonate to the sum of the ethylene carbonate and the dialkyl carbonate in the nonaqueous solvent being from 5% by volume to 50% by volume.

The proportion of the diphenyl carbonate in the nonaqueous electrolytic solution is 0.001% by weight or higher, preferably 0.01% by weight or higher, more preferably 0.05% by weight or higher, especially preferably 0.1% by weight or higher. When the proportion of the diphenyl carbonate in the nonaqueous electrolytic solution is a concentration lower than that, there are cases where the effects of the invention may be hardly produced. Conversely, too high concentrations of diphenyl carbonate may result in cases where the battery has reduced high-temperature storability. Because of this, the upper limit thereof is lower than 5% by weight, preferably 4% by weight or lower, more preferably 3% by weight or lower, especially preferably 2% by weight or lower, most preferably 1.5% by weight or lower.

As compound (b), any one of vinylene carbonate, cyclic carbonate compounds having a fluorine atom, monofluorophosphoric acid salts, and difluorophosphoric acid salts may be used, or two or more thereof may be used in combination.

Detailed explanations on the cyclic carbonate compounds having a fluorine atom, monofluorophosphoric acid salts, and difluorophosphoric acid salts are as given above.

For example, a cyclic carbonate compound having a fluorine atom may be used in combination with vinylene carbonate or with a monofluorophosphoric acid salt and/or a difluorophosphoric acid salt. Use of these compounds in combination is preferred from the standpoints of improving cycle characteristics and improving high-temperature storability.

Furthermore, a monofluorophosphoric acid salt and/or a difluorophosphoric acid salt may be used in combination with vinylene carbonate or a cyclic carbonate compound having a fluorine atom. From the standpoints of improving cycle characteristics and improving characteristics after high-temperature storage, a monofluorophosphoric acid salt and/or a difluorophosphoric acid salt is used preferably in combination with vinylene carbonate or fluoroethylene carbonate, more preferably in combination with vinylene carbonate.

The total proportion of compound (b) in the nonaqueous electrolytic solution of the invention is 0.001% by weight or higher, preferably 0.01% by weight or higher, more preferably 0.05% by weight or higher, especially preferably 0.1% by weight or higher. When the content of compound (b) in the nonaqueous electrolytic solution is a concentration lower than that, there are cases where the effect of improving the cycle characteristics and high-temperature storability of batteries cannot be sufficiently produced. Conversely, too high concentrations of compound (b) may result in cases where gas evolution during high-temperature storage is enhanced or low-temperature discharge characteristics decrease. Consequently, the upper limit thereof is 20% by weight or lower, preferably 10% by weight or lower, more preferably 5% by weight or lower, especially preferably 4% by weight or lower, most preferably 3% by weight or lower.

In the case where the nonaqueous electrolytic solution contains vinylene carbonate as compound (b), the proportion thereof in the nonaqueous electrolytic solution is as follows. The lower limit thereof is preferably 0.001% by weight or higher, more preferably 0.01% by weight or higher, especially preferably 0.1% by weight or higher, most preferably 0.3% by weight or higher. The upper limit thereof is preferably 8% by weight or lower, more preferably 4% by weight or lower, especially preferably 3% by weight or lower.

In the case where the nonaqueous electrolytic solution contains a cyclic carbonate compound having a fluorine atom as compound (b), the proportion thereof in the nonaqueous electrolytic solution is as follows. The lower limit thereof is preferably 0.001% by weight or higher, more preferably 0.1% by weight or higher, especially preferably 0.3% by weight or higher, most preferably 0.5% by weight or higher. The upper limit thereof is preferably 20% by weight or lower, more preferably 10% by weight or lower, even more preferably 5% by weight or lower, especially preferably 3% by weight or lower.

In the case where the nonaqueous electrolytic solution contains a monofluorophosphoric acid salt and/or a difluorophosphoric acid salt as compound (b), the proportion thereof in the nonaqueous electrolytic solution is as follows. The lower limit thereof is preferably 0.001% by weight or higher, more preferably 0.01% by weight or higher, especially preferably 0.1% by weight or higher, most preferably 0.2% by weight or higher. The upper limit thereof is preferably 5% by weight or lower, more preferably 3% by weight or lower, especially preferably 2% by weight or lower.

The reason why the nonaqueous electrolytic solution of the invention which contains diphenyl carbonate and compound (b) in a given proportion attains excellent safety during overcharge and further attains excellent high-temperature storability has not been elucidated in detail. However, the reason is presumed to be as follows, although the mechanism of the effects of the invention should not be construed as being limited to the following.

Diphenyl carbonate has a lower oxidation potential than solvent ingredients and can react on the positive electrode in an earlier stage in the case of overcharge and thereby enhance safety during overcharge. However, diphenyl carbonate is more apt to be reduced than solvent ingredients and undergoes side reactions on the negative electrode during high-temperature storage to reduce battery characteristics through the high-temperature storage. It is, however, thought that by using diphenyl carbonate in combination with compound (b), which forms a stable protective coating film on the surface of the negative electrode, the diphenyl carbonate can be inhibited from undergoing side reactions on the negative-electrode side because these compounds form a stable protective coating film on the surface of the negative electrode. It is also thought that when the nonaqueous electrolytic solution further contains a monofluorophosphoric acid salt and a difluorophosphoric acid salt, a protective coating film is formed also on the positive-electrode side and side reactions can be inhibited from occurring also on the positive-electrode side during high-temperature storage.

Furthermore, it is thought that in the case where the nonaqueous electrolytic solution contains vinylene carbonate, the vinylene carbonate can enhance safety during overcharge in cooperation with the diphenyl carbonate, because vinylene carbonate also has a lower oxidation potential than solvent ingredients and the oxidation potential thereof is close to that of diphenyl carbonate.

From the standpoint of effectively producing those effects, the weight ratio between the diphenyl carbonate and compound (b) contained in the nonaqueous electrolytic solution is preferably regulated so that diphenyl carbonate/compound (b)=1/(0.1-10).

In the case where vinylene carbonate and a monofluorophosphoric acid salt and/or difluorophosphoric acid salt are used in combination as compound (b), the content weight ratio between the vinylene carbonate and the monofluorophosphoric acid salt and/or difluorophosphoric acid salt is preferably regulated so that vinylene carbonate/monofluorophosphoric acid salt and/or difluorophosphoric acid salt=1/(0.1-5).

Fourth Embodiment of the Invention

The nonaqueous electrolytic solution (D) according to the fourth embodiment of the invention, which includes the electrolyte and nonaqueous solvent described above, is characterized by containing at least one of phosphoric acid ester compounds and carboxylic acid ester compounds which have a phenyl group substituted by an alkyl group that may have a substituent, and the alkyl group by which the phenyl group is substituted each has 4 or more carbon atoms. (Such a phosphoric acid ester compound or carboxylic acid ester compound is hereinafter often referred to as the phosphoric acid ester compound of the invention or the carboxylic acid ester compound of the invention.)

From the standpoints of improving safety during overcharge and improving the characteristics of batteries which have undergone high-temperature storage, it is preferred that the phosphoric acid ester compound of the invention or the carboxylic acid ester compound of the invention should include a phosphoric acid ester compound and/or chain carboxylic acid ester compound in which all phenyl groups have been substituted by one or more alkyl groups having 4 or more carbon atoms. Especially preferred is such a phosphoric acid ester compound.

The molecular weight of the phosphoric acid ester compound of the invention is as follows. The lower limit thereof is generally 250 or higher, preferably 300 or higher, especially preferably 400 or higher, from the standpoint of improving safety during overcharge. The upper limit thereof is generally 1,500 or lower, preferably 800 or lower, especially preferably 700 or lower, from the standpoints of improving safety during overcharge and of battery characteristics and solubility in the electrolytic solution.

The molecular weight of the carboxylic acid ester compound of the invention is as follows. The lower limit thereof is generally 180 or higher from the standpoint of improving safety during overcharge. The upper limit thereof is generally 1,000 or lower, preferably 500 or lower, especially preferably 400 or lower, from the standpoints of improving safety during overcharge and of battery characteristics and solubility in the electrolytic solution.

Examples of the alkyl groups having 4 or more carbon atoms include n-butyl, isobutyl, sec-butyl, tert-butyl, n-pentyl, t-amyl, 1,1-dimethylbutyl, cyclobutyl, cyclopentyl, cyclohexyl, 1-methylcyclohexyl, and 1-ethylcyclohexyl.

The lower limit of the number of carbon atoms of each alkyl group is generally 4 or more from the standpoint of improving safety during overcharge. The upper limit thereof is generally 12 or less, preferably 8 or less, more preferably 6 or less, from the standpoints of improving safety during overcharge and of battery characteristics and solubility in the electrolytic solution.

The alkyl groups preferably are secondary alkyl groups or tertiary alkyl groups. Preferred of these are sec-butyl, t-butyl, t-amyl, 1,1-dimethylbutyl, cyclopentyl, cyclohexyl, 1-methylcyclohexyl, and 1-ethylcyclohexyl. Especially preferred are t-butyl, t-amyl, 1,1-dimethylbutyl, cyclopentyl, cyclohexyl, 1-methylcyclohexyl, and 1-ethylcyclohexyl.

In these alkyl groups, part or all of the hydrogen atoms may have been replaced by fluorine atoms.

Each phenyl group may have a plurality of alkyl groups bonded thereto.

Examples of the phosphoric acid ester compound of the invention include the following.
Tris(2-n-butylphenyl)phosphate,
tris(3-n-butylphenyl)phosphate,
tris(4-n-butylphenyl)phosphate,
tris(2,4-di-n-butylphenyl)phosphate,
tris(3,5-di-n-butylphenyl)phosphate,
tris(2-isobutylphenyl)phosphate,
tris(3-isobutylphenyl)phosphate,
tris(4-isobutylphenyl)phosphate,
tris(2,4-diisobutylphenyl)phosphate,
tris(3,5-diisobutylphenyl)phosphate,
tris(2-sec-butylphenyl)phosphate,
tris(3-sec-butylphenyl)phosphate,
tris(4-sec-butylphenyl)phosphate,
tris(2,4-di-sec-butylphenyl)phosphate,
tris(3,5-di-sec-butylphenyl)phosphate,
tris(2-t-butylphenyl)phosphate,
tris(3-t-butylphenyl)phosphate,
tris(4-t-butylphenyl)phosphate,
tris(2,4-di-t-butylphenyl)phosphate,
tris(3,5-di-t-butylphenyl)phosphate,
tris(2-t-amylphenyl)phosphate,
tris(3-t-amylphenyl)phosphate,
tris(4-t-amylphenyl)phosphate,
tris(2,4-di-t-amylphenyl)phosphate,
tris(3,5-di-t-amylphenyl)phosphate,
tris(2-cyclopentylphenyl)phosphate,
tris(3-cyclopentylphenyl)phosphate,
tris(4-cyclopentylphenyl)phosphate,
tris(2,4-dicyclopentylphenyl)phosphate,
tris(3,5-dicyclopentylphenyl)phosphate,
tris(2-cyclohexylphenyl)phosphate,
tris(3-cyclohexylphenyl)phosphate,
tris(4-cyclohexylphenyl)phosphate,
tris(2,4-dicyclohexylphenyl)phosphate,
tris(3,5-dicyclohexylphenyl)phosphate,
2-t-butylphenyl diphenyl phosphate,
3-t-butylphenyl diphenyl phosphate,
4-t-butylphenyl diphenyl phosphate,
bis(2-t-butylphenyl)phenyl phosphate,
bis(3-t-butylphenyl)phenyl phosphate,
bis(4-t-butylphenyl)phenyl phosphate,
2-t-butylphenyl dimethyl phosphate,
3-t-butylphenyl dimethyl phosphate,
4-t-butylphenyl dimethyl phosphate,
bis(2-t-butylphenyl)methyl phosphate,
bis(3-t-butylphenyl)methyl phosphate,
bis(4-t-butylphenyl)methyl phosphate,
2-t-butylphenyl diethyl phosphate,
3-t-butylphenyl diethyl phosphate,
4-t-butylphenyl diethyl phosphate,
bis(2-t-butylphenyl)ethyl phosphate,
bis(3-t-butylphenyl)ethyl phosphate, and
bis(4-t-butylphenyl)ethyl phosphate.

Examples of the carboxylic acid ester compound of the invention include the following.
2-n-butylphenyl acetate,
3-n-butylphenyl acetate,
4-n-butylphenyl acetate,
2-isobutylphenyl acetate,
3-isobutylphenyl acetate,
4-isobutylphenyl acetate,
2-sec-butylphenyl acetate,
3-sec-butylphenyl acetate,
4-sec-butylphenyl acetate,
2-t-butylphenyl acetate,
3-t-butylphenyl acetate,
4-t-butylphenyl acetate,
2-t-amylphenyl acetate,
3-t-amylphenyl acetate,
4-t-amylphenyl acetate,
2-cyclopentylphenyl acetate,
3-cyclopentylphenyl acetate,
4-cyclopentylphenyl acetate,
2-cyclohexylphenyl acetate,
3-cyclohexylphenyl acetate,
4-cyclohexylphenyl acetate,
2-n-butylphenyl propionate,
3-n-butylphenyl propionate,
4-n-butylphenyl propionate,
2-isobutylphenyl propionate,
3-isobutylphenyl propionate,
4-isobutylphenyl propionate,
2-sec-butylphenyl propionate,
3-sec-butylphenyl propionate,
4-sec-butylphenyl propionate,
2-t-butylphenyl propionate,
3-t-butylphenyl propionate,
4-t-butylphenyl propionate,
2-t-amylphenyl propionate,
3-t-amylphenyl propionate,
4-t-amylphenyl propionate,
2-cyclopentylphenyl propionate,
3-cyclopentylphenyl propionate,
4-cyclopentylphenyl propionate,
2-cyclohexylphenyl propionate,
3-cyclohexylphenyl propionate,
4-cyclohexylphenyl propionate,
methyl 2-n-butylbenzoate,
methyl 3-n-butylbenzoate,
methyl 4-n-butylbenzoate, methyl 2-isobutylbenzoate,
methyl 3-isobutylbenzoate,
methyl 4-isobutylbenzoate,
methyl 2-sec-butylbenzoate,
methyl 3-sec-butylbenzoate,
methyl 4-sec-butylbenzoate,
methyl 2-t-butylbenzoate,
methyl 3-t-butylbenzoate,
methyl 4-t-butylbenzoate,
methyl 2-t-amylbenzoate,
methyl 3-t-amylbenzoate,
methyl 4-t-amylbenzoate,
methyl 2-cyclohexylbenzoate,
methyl 3-cyclohexylbenzoate,
methyl 4-cyclohexylbenzoate,
ethyl 2-n-butylbenzoate,
ethyl 3-n-butylbenzoate,
ethyl 4-n-butylbenzoate,
ethyl 2-isobutylbenzoate,
ethyl 3-isobutylbenzoate,
ethyl 4-isobutylbenzoate,
ethyl 2-sec-butylbenzoate,
ethyl 3-sec-butylbenzoate,
ethyl 4-sec-butylbenzoate,
ethyl 2-t-butylbenzoate,
ethyl 3-t-butylbenzoate,
ethyl 4-t-butylbenzoate,
ethyl 2-t-amylbenzoate,
ethyl 3-t-amylbenzoate,
ethyl 4-t-amylbenzoate,
ethyl 2-cyclohexylbenzoate,
ethyl 3-cyclohexylbenzoate,
ethyl 4-cyclohexylbenzoate,
phenyl 2-n-butylbenzoate,
phenyl 3-n-butylbenzoate,
phenyl 4-n-butylbenzoate,
phenyl 2-isobutylbenzoate,
phenyl 3-isobutylbenzoate,
phenyl 4-isobutylbenzoate,
phenyl 2-sec-butylbenzoate,
phenyl 3-sec-butylbenzoate,
phenyl 4-sec-butylbenzoate,
phenyl 2-t-butylbenzoate,
phenyl 3-t-butylbenzoate,
phenyl 4-t-butylbenzoate,
phenyl 2-t-amylbenzoate,
phenyl 3-t-amylbenzoate,
phenyl 4-t-amylbenzoate,
phenyl 2-cyclohexylbenzoate,
phenyl 3-cyclohexylbenzoate, and
phenyl 4-cyclohexylbenzoate.

Preferred of these, from the standpoints of improving safety during overcharge and battery characteristics, are the compounds having a phenyl group substituted by secondary alkyl group or tertiary alkyl group, such as
tris(2-sec-butylphenyl)phosphate,
tris(3-sec-butylphenyl)phosphate,
tris(4-sec-butylphenyl)phosphate,
tris(2,4-di-sec-butylphenyl)phosphate,
tris(3,5-di-sec-butylphenyl)phosphate,
tris(2-t-butylphenyl)phosphate,
tris(3-t-butylphenyl)phosphate,
tris(4-t-butylphenyl)phosphate,
tris(2,4-di-t-butylphenyl)phosphate,
tris(3,5-di-t-butylphenyl)phosphate,
tris(2-t-amylphenyl)phosphate,
tris(3-t-amylphenyl)phosphate,
tris(4-t-amylphenyl)phosphate,
tris(2,4-di-t-amylphenyl)phosphate,
tris(3,5-di-t-amylphenyl)phosphate,
tris(2-cyclopentylphenyl)phosphate,
tris(3-cyclopentylphenyl)phosphate,
tris(4-cyclopentylphenyl)phosphate,
tris(2,4-dicyclopentylphenyl)phosphate,
tris(3,5-dicyclopentylphenyl)phosphate,
tris(2-cyclohexylphenyl)phosphate,
tris(3-cyclohexylphenyl)phosphate,
tris(4-cyclohexylphenyl)phosphate,
tris(2,4-dicyclohexylphenyl)phosphate,
tris(3,5-dicyclohexylphenyl)phosphate,
2-t-butylphenyl diphenyl phosphate,
3-t-butylphenyl diphenyl phosphate,
4-t-butylphenyl diphenyl phosphate,
bis(2-t-butylphenyl)phenyl phosphate,
bis(3-t-butylphenyl)phenyl phosphate,
bis(4-t-butylphenyl)phenyl phosphate,
2-t-butylphenyl dimethyl phosphate,
3-t-butylphenyl dimethyl phosphate,
4-t-butylphenyl dimethyl phosphate,
bis(2-t-butylphenyl)methyl phosphate,
bis(3-t-butylphenyl)methyl phosphate,
bis(4-t-butylphenyl)methyl phosphate,
2-t-butylphenyl diethyl phosphate,
3-t-butylphenyl diethyl phosphate,
4-t-butylphenyl diethyl phosphate,
bis(2-t-butylphenyl)ethyl phosphate,
bis(3-t-butylphenyl)ethyl phosphate,
bis(4-t-butylphenyl)ethyl phosphate,
2-sec-butylphenyl acetate,
3-sec-butylphenyl acetate,
4-sec-butylphenyl acetate,
2-t-butylphenyl acetate,
3-t-butylphenyl acetate,
4-t-butylphenyl acetate,
2-t-amylphenyl acetate,
3-t-amylphenyl acetate,
4-t-amylphenyl acetate,
2-cyclopentylphenyl acetate,
3-cyclopentylphenyl acetate,
4-cyclopentylphenyl acetate,
2-cyclohexylphenyl acetate,
3-cyclohexylphenyl acetate,
4-cyclohexylphenyl acetate,
2-sec-butylphenyl propionate,
3-sec-butylphenyl propionate,
4-sec-butylphenyl propionate,
2-t-butylphenyl propionate,
3-t-butylphenyl propionate,
4-t-butylphenyl propionate,
2-t-amylphenyl propionate,
3-t-amylphenyl propionate,
4-t-amylphenyl propionate,
2-cyclopentylphenyl propionate,
3-cyclopentylphenyl propionate,
4-cyclopentylphenyl propionate,
2-cyclohexylphenyl propionate,
3-cyclohexylphenyl propionate,
4-cyclohexylphenyl propionate,
methyl 2-sec-butylbenzoate,
methyl 3-sec-butylbenzoate,
methyl 4-sec-butylbenzoate,
methyl 2-t-butylbenzoate,
methyl 3-t-butylbenzoate,
methyl 4-t-butylbenzoate, methyl 2-t-amylbenzoate,
methyl 3-t-amylbenzoate,
methyl 4-t-amylbenzoate,
methyl 2-cyclohexylbenzoate,
methyl 3-cyclohexylbenzoate,
methyl 4-cyclohexylbenzoate,
ethyl 2-sec-butylbenzoate,
ethyl 3-sec-butylbenzoate,
ethyl 4-sec-butylbenzoate,
ethyl 2-t-butylbenzoate,
ethyl 3-t-butylbenzoate,
ethyl 4-t-butylbenzoate,
ethyl 2-t-amylbenzoate,
ethyl 3-t-amylbenzoate,
ethyl 4-t-amylbenzoate,
ethyl 2-cyclohexylbenzoate,
ethyl 3-cyclohexylbenzoate,
ethyl 4-cyclohexylbenzoate,
phenyl 2-sec-butylbenzoate,
phenyl 3-sec-butylbenzoate,
phenyl 4-sec-butylbenzoate,
phenyl 2-t-butylbenzoate,
phenyl 3-t-butylbenzoate,
phenyl 4-t-butylbenzoate,
phenyl 2-t-amylbenzoate,
phenyl 3-t-amylbenzoate,
phenyl 4-t-amylbenzoate,
phenyl 2-cyclohexylbenzoate,
phenyl 3-cyclohexylbenzoate, and
phenyl 4-cyclohexylbenzoate.

More preferred are the compounds having a phenyl group substituted by t-alkyl group or cycloalkyl group, such as
tris(2-t-butylphenyl)phosphate,
tris(3-t-butylphenyl)phosphate,
tris(4-t-butylphenyl)phosphate,
tris(2,4-di-t-butylphenyl)phosphate,
tris(3,5-di-t-butylphenyl)phosphate,
tris(2-t-amylphenyl)phosphate,
tris(3-t-amylphenyl)phosphate,
tris(4-t-amylphenyl)phosphate,
tris(2,4-di-t-amylphenyl)phosphate,
tris(3,5-di-t-amylphenyl)phosphate,
tris(2-cyclopentylphenyl)phosphate,
tris(3-cyclopentylphenyl)phosphate,
tris(4-cyclopentylphenyl)phosphate,
tris(2,4-dicyclopentylphenyl)phosphate,
tris(3,5-dicyclopentylphenyl)phosphate,
tris(2-cyclohexylphenyl)phosphate,
tris(3-cyclohexylphenyl)phosphate,
tris(4-cyclohexylphenyl)phosphate,
tris(2,4-dicyclohexylphenyl)phosphate,
tris(3,5-dicyclohexylphenyl)phosphate,
2-t-butylphenyl diphenyl phosphate,
3-t-butylphenyl diphenyl phosphate,
4-t-butylphenyl diphenyl phosphate,
bis(2-t-butylphenyl)phenyl phosphate,
bis(3-t-butylphenyl)phenyl phosphate,
bis(4-t-butylphenyl)phenyl phosphate,
2-t-butylphenyl dimethyl phosphate,
3-t-butylphenyl dimethyl phosphate,
4-t-butylphenyl dimethyl phosphate,
bis(2-t-butylphenyl)methyl phosphate,
bis(3-t-butylphenyl)methyl phosphate,
bis(4-t-butylphenyl)methyl phosphate,
2-t-butylphenyl diethyl phosphate,
3-t-butylphenyl diethyl phosphate,
4-t-butylphenyl diethyl phosphate,
bis(2-t-butylphenyl)ethyl phosphate,
bis(3-t-butylphenyl)ethyl phosphate,
bis(4-t-butylphenyl)ethyl phosphate,
2-t-butylphenyl acetate,
3-t-butylphenyl acetate,
4-t-butylphenyl acetate,
2-t-amylphenyl acetate,
3-t-amylphenyl acetate,
4-t-amylphenyl acetate,
2-cyclopentylphenyl acetate,
3-cyclopentylphenyl acetate,
4-cyclopentylphenyl acetate,
2-cyclohexylphenyl acetate,
3-cyclohexylphenyl acetate,
4-cyclohexylphenyl acetate,
2-t-butylphenyl propionate,
3-t-butylphenyl propionate,
4-t-butylphenyl propionate,
2-t-amylphenyl propionate,
3-t-amylphenyl propionate,
4-t-amylphenyl propionate,
2-cyclopentylphenyl propionate,
3-cyclopentylphenyl propionate,
4-cyclopentylphenyl propionate,
2-cyclohexylphenyl propionate,
3-cyclohexylphenyl propionate,
4-cyclohexylphenyl propionate,
methyl 2-t-butylbenzoate,
methyl 3-t-butylbenzoate,
methyl 4-t-butylbenzoate,
methyl 2-t-amylbenzoate,
methyl 3-t-amylbenzoate,
methyl 4-t-amylbenzoate,
methyl 2-cyclohexylbenzoate,
methyl 3-cyclohexylbenzoate,
methyl 4-cyclohexylbenzoate,
ethyl 2-t-butylbenzoate,
ethyl 3-t-butylbenzoate,
ethyl 4-t-butylbenzoate,
ethyl 2-t-amylbenzoate,
ethyl 3-t-amylbenzoate,
ethyl 4-t-amylbenzoate,
ethyl 2-cyclohexylbenzoate,
ethyl 3-cyclohexylbenzoate,
ethyl 4-cyclohexylbenzoate,
phenyl 2-t-butylbenzoate,
phenyl 3-t-butylbenzoate,
phenyl 4-t-butylbenzoate,
phenyl 2-t-amylbenzoate,
phenyl 3-t-amylbenzoate,
phenyl 4-t-amylbenzoate,
phenyl 2-cyclohexylbenzoate,
phenyl 3-cyclohexylbenzoate, and
phenyl 4-cyclohexylbenzoate.

Even more preferred are phosphoric acid ester compounds and chain carboxylic acid ester compounds such as
tris(2-t-butylphenyl)phosphate,
tris(3-t-butylphenyl)phosphate,
tris(4-t-butylphenyl)phosphate,
tris(2,4-di-t-butylphenyl)phosphate,
tris(3,5-di-t-butylphenyl)phosphate,
tris(2-t-amylphenyl)phosphate,
tris(3-t-amylphenyl)phosphate,
tris(4-t-amylphenyl)phosphate,
tris(2,4-di-t-amylphenyl)phosphate,
tris(3,5-di-t-amylphenyl)phosphate,
tris(2-cyclopentylphenyl)phosphate, tris(3-cyclopentylphenyl)phosphate,
tris(4-cyclopentylphenyl)phosphate,
tris(2,4-dicyclopentylphenyl)phosphate,
tris(3,5-dicyclopentylphenyl)phosphate,
tris(2-cyclohexylphenyl)phosphate,
tris(3-cyclohexylphenyl)phosphate,
tris(4-cyclohexylphenyl)phosphate,
tris(2,4-dicyclohexylphenyl)phosphate,
tris(3,5-dicyclohexylphenyl)phosphate,
2-t-butylphenyl diphenyl phosphate,
3-t-butylphenyl diphenyl phosphate,
4-t-butylphenyl diphenyl phosphate,
bis(2-t-butylphenyl)phenyl phosphate,
bis(3-t-butylphenyl)phenyl phosphate,
bis(4-t-butylphenyl)phenyl phosphate,
2-t-butylphenyl dimethyl phosphate,
3-t-butylphenyl dimethyl phosphate,
4-t-butylphenyl dimethyl phosphate,
bis(2-t-butylphenyl)methyl phosphate,
bis(3-t-butylphenyl)methyl phosphate,
bis(4-t-butylphenyl)methyl phosphate,
2-t-butylphenyl diethyl phosphate,
3-t-butylphenyl diethyl phosphate,
4-t-butylphenyl diethyl phosphate,
bis(2-t-butylphenyl)ethyl phosphate,
bis(3-t-butylphenyl)ethyl phosphate,
bis(4-t-butylphenyl)ethyl phosphate,
2-t-butylphenyl acetate,
3-t-butylphenyl acetate,
4-t-butylphenyl acetate,
2-t-amylphenyl acetate,
3-t-amylphenyl acetate,
4-t-amylphenyl acetate,
2-cyclopentylphenyl acetate,
3-cyclopentylphenyl acetate,
4-cyclopentylphenyl acetate,
2-cyclohexylphenyl acetate,
3-cyclohexylphenyl acetate,
4-cyclohexylphenyl acetate,
2-t-butylphenyl propionate,
3-t-butylphenyl propionate,
4-t-butylphenyl propionate,
2-t-amylphenyl propionate,
3-t-amylphenyl propionate,
4-t-amylphenyl propionate,
2-cyclopentylphenyl propionate,
3-cyclopentylphenyl propionate,
4-cyclopentylphenyl propionate,
2-cyclohexylphenyl propionate,
3-cyclohexylphenyl propionate, and
4-cyclohexylphenyl propionate.

Especially preferred are phosphoric acid ester compounds such as
tris(2-t-butylphenyl)phosphate,
tris(3-t-butylphenyl)phosphate,
tris(4-t-butylphenyl)phosphate,
tris(2,4-di-t-butylphenyl)phosphate,
tris(3,5-di-t-butylphenyl)phosphate,
tris(2-t-amylphenyl)phosphate,
tris(3-t-amylphenyl)phosphate,
tris(4-t-amylphenyl)phosphate,
tris(2,4-di-t-amylphenyl)phosphate,
tris(3,5-di-t-amylphenyl)phosphate,
tris(2-cyclopentylphenyl)phosphate,
tris(3-cyclopentylphenyl)phosphate,
tris(4-cyclopentylphenyl)phosphate,
tris(2,4-dicyclopentylphenyl)phosphate,
tris(3,5-dicyclopentylphenyl)phosphate,
tris(2-cyclohexylphenyl)phosphate,
tris(3-cyclohexylphenyl)phosphate,
tris(4-cyclohexylphenyl)phosphate,
tris(2,4-dicyclohexylphenyl)phosphate, and
tris(3,5-dicyclohexylphenyl)phosphate.

Most preferred are
tris(2-t-butylphenyl)phosphate,
tris(3-t-butylphenyl)phosphate,
tris(4-t-butylphenyl)phosphate,
tris(2,4-di-t-butylphenyl)phosphate,
tris(3,5-di-t-butylphenyl)phosphate,
tris(2-t-amylphenyl)phosphate,
tris(3-t-amylphenyl)phosphate,
tris(4-t-amylphenyl)phosphate,
tris(2,4-di-t-amylphenyl)phosphate, and
tris(3,5-di-t-amylphenyl)phosphate.

One of such phosphoric acid ester compounds of the invention and carboxylic acid ester compounds of the invention may be used alone, or two or more thereof may be used in combination. The proportion of the phosphoric acid ester compound of the invention and the carboxylic acid ester compound of the invention (when two or more compounds are used, the total proportion thereof) in the nonaqueous electrolytic solution is generally 0.001% by weight or higher, preferably 0.01% by weight or higher, more preferably 0.05% by weight or higher, especially preferably 0.1% by weight or higher. When the proportion thereof is a concentration lower than that, there are cases where the effects of the invention may be hardly produced. Conversely, too high concentrations may result in cases where the battery has a reduced capacity. Consequently, the upper limit thereof is generally lower than 10% by weight, preferably 5% by weight or lower, more preferably 3% by weight or lower, especially preferably 2% by weight or lower, most preferably 1.5% by weight or lower.

The reason why the nonaqueous electrolytic solution (D) according to the fourth embodiment of the invention attains excellent safety during overcharge and further attains excellent high-temperature storability is unclear. However, the reason is presumed to be as follows, although the invention should not be construed as being limited by the following mechanism.

In general, the electron-donating properties of alkyl groups are enhanced as the number of carbon atoms of the alkyl groups increases. Furthermore, secondary alkyl groups and tertiary alkyl groups have higher electron-donating properties than primary alkyl groups. Consequently, compared to phosphoric acid ester compounds and carboxylic acid ester compounds which have a phenyl group having no alkyl substituent, phosphoric acid ester compounds and carboxylic acid ester compounds which have one or more phenyl groups substituted by one or more alkyl groups having 4 or more carbon atoms have a lower oxidation potential and can react in an earlier stage in the case of overcharge and thereby enhance safety during overcharge. Usually, compounds having a low oxidation potential react at highly active areas in the electrodes even during high-temperature storage to reduce battery characteristics through the high-temperature storage. However, it is thought that when the ester compounds have one or more alkyl groups which possess 4 or more carbon atoms, and the alkyl groups by which the phenyl groups are substituted each have 4 or more carbon atoms, then side reactions are inhibited from occurring during high-temperature storage due to the steric hindrance caused by the alkyl groups and discharge characteristics are inhibited from considerably decreasing through high-temperature storage.

The compounds of the invention are not limited so long as the compounds are contained in a battery. For example, the compounds may be incorporated into a positive electrode or negative electrode and/or a separator, without being incorporated into the electrolytic solution beforehand. There are cases where incorporation of the compounds into the positive electrode or separator is preferred because this incorporation inhibits side reactions from occurring on the negative-electrode side during initial charge.

The nonaqueous electrolytic solution according to the fourth embodiment of the invention may contain a cyclic carbonate compound having an unsaturated C=C bond, a cyclic carbonate compound having a fluorine atom, a monofluorophosphoric acid salt, and a difluorophosphoric acid salt, such as those described above, unless these compounds lessen the effects of the invention.

Ingredients, etc. common among various embodiments of the invention are explained below.

<Other Compounds>

The nonaqueous electrolytic solutions according to the invention may contain various other compounds, such as conventionally known overcharge protection agents, as auxiliaries unless this lessens the effects of the invention.

Examples of the conventionally known overcharge protection agents include aromatic compounds such as biphenyl, alkylbiphenyls, e.g., 2-methylbiphenyl, terphenyl, partly hydrogenated terphenyls, cyclopentylbenzene, cyclohexylbenzene (phenylcyclohexane), cis-1-propyl-4-phenylcyclohexane, trans-1-propyl-4-phenylcyclohexane, cis-1-butyl-4-phenylcyclohexane, trans-1-butyl-4-phenylcyclohexane, t-butylbenzene, t-amylbenzene, diphenyl ether, and dibenzofuran; products of partial hydrogenation of these aromatic compounds, such as 2-fluorobiphenyl, 3-fluorobiphenyl, 4-fluorobiphenyl, 4,4'-difluorobiphenyl, o-cyclohexylfluorobenzene, and p-cyclohexylfluorobenzene; and fluorine-containing anisole compounds such as 2,4-difluoroanisole, 2,5-difluoroanisole, 2,6-difloroanisole, and 3,5-difluoroanisole.

Preferred of these are aromatic compounds such as biphenyl, alkylbiphenyls, e.g., 2-methylbiphenyl, terphenyl, partly hydrogenated terphenyls, cyclopentylbenzene, cyclohexylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, t-butylbenzene, t-amylbenzene, diphenyl ether, and dibenzofuran; and products of partial hydrogenation of these aromatic compounds, such as 2-fluorobiphenyl, 3-fluorobiphenyl, 4-fluorobiphenyl, 4,4'-difluorobiphenyl, o-cyclohexylfluorobenzene, and p-cyclohexylfluorobenzene. More preferred are partly hydrogenated terphenyls, cyclopentylbenzene, cyclohexylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, t-butylbenzene, t-amylbenzene, o-cyclohexylfluorobenzene, and p-cyclohexylfluorobenzene. Especially preferred are partly hydrogenated terphenyls and cyclohexylbenzene.

These overcharge protection agents may be used alone or in combination of two or more thereof.

In the case where two or more overcharge protection agents are used in combination, it is especially preferred, from the standpoint of a balance between overcharge inhibitive properties and high-temperature storability, to employ a combination of a partly hydrogenated terphenyl or cyclohexylbenzene with t-butylbenzene or t-amylbenzene or to use one selected from aromatic compounds containing no oxygen, such as biphenyl, alkylbiphenyls, terphenyl, partly hydrogenated terphenyls, cyclohexylbenzene, t-butylbenzene, and t-amylbenzene, in combination with one selected from oxygen-containing aromatic compounds such as diphenyl ether and dibenzofuran.

The proportion of these overcharge protection agents in the nonaqueous electrolytic solution is generally 0.1% by weight or higher, preferably 0.2% by weight or higher, especially preferably 0.3% by weight or higher, most preferably 0.5% by weight or higher. The upper limit thereof is generally 5% by weight or lower, preferably 3% by weight or lower, especially preferably 2% by weight or lower. When the proportion thereof is a concentration lower than the lower limit, there are cases where the desired effect of the overcharge protection agents is rarely produced. Conversely, in case where the concentration of the overcharge protection agents is too high, battery characteristics including high-temperature storability tend to decrease.

Examples of other auxiliaries include carbonate compounds such as erythritan carbonate, spirobisdimethylene carbonate, and methoxyethyl methyl carbonate; carboxylic acid anhydrides such as succinic anhydride, glutaric anhydride, maleic anhydride, itaconic anhydride, citraconic anhydride, glutaconic anhydride, diglycolic anhydride, cyclohexanedicarboxylic acid anhydride, cyclopentanetetracarboxylic acid dianhydride, and phenylsuccinic anhydride; dicarboxylic acid diester compounds such as dimethyl succinate, diethyl succinate, diallyl succinate, dimethyl maleate, diethyl maleate, diallyl maleate, dipropyl maleate, dibutyl maleate, bis(trifluoromethyl)maleate, bis(pentafluoroethyl)maleate, and bis(2,2,2-trifluoroethyl)maleate; Spiro compounds such as 2,4,8,10-tetraoxaspiro[5.5]undecane and 3,9-divinyl-2,4,8,10-tetraoxaspiro[5.5]undecane; sulfur-containing compounds such as ethylene sulfite, propylene sulfite, 1,3-propanesultone, 1,4-butanesultone, 1,3-propenesultone, 1,4-butenesultone, methyl methanesulfonate, ethyl methanesulfonate, methyl methoxymethanesulfonate, methyl 2-methoxyethanesulfonate, busulfan, diethylene glycol dimethanesulfonate, 1,2-ethanediol bis(2,2,2-trifluoroethanesulfonate), 1,4-butanediol bis(2,2,2-trifluoroethanesulfonate), sulfolane, sulfolene, dimethyl sulfone, diphenyl sulfone, N,N-dimethylmethanesulfonamide, and N,N-diethylmethanesulfonamide; nitrogen-containing compounds such as 1-methyl-2-pyrrolidinone, 1-methyl-2-piperidone, 3-methyl-2-oxazolidinone, 1,3-dimethyl-2-imidazolidinone, and N-methylsuccinimide; hydrocarbon compounds such as heptane, octane, nonane, decane, cycloheptane, methylcyclohexane, ethylcyclohexane, propylcyclohexane, n-butylcyclohexane, t-butylcyclohexane, and dicyclohexyl; fluorinated benzenes and fluorinated toluenes, such as fluorobenzene, difluorobenzene, hexafluorobenzene, and benzotrifluoride; and nitrile compounds such as acetonitrile, propionitrile, butyronitrile, malononitrile, succinonitrile, glutaronitrile, and adiponitrile.

These other auxiliaries may be used alone or in combination of two or more thereof.

More preferred of these, from the standpoint of improving the characteristics of batteries which have undergo high-temperature storage, are sulfur-containing compounds such as ethylene sulfite, 1,3-propanesultone, 1,4-butanesultone, 1,3-propenesultone, 1,4-butenesultone, busulfan, and 1,4-butanediol bis(2,2,2-trifluoroethanesulfonate); and nitrile compounds such as acetonitrile, propionitrile, butyronitrile, malononitrile, succinonitrile, glutaronitrile, and adiponitrile.

The proportion of these auxiliaries in the nonaqueous electrolytic solution is not particularly limited from the standpoint of producing the effects of the invention. However, the proportion thereof is generally 0.01% by weight or higher, preferably 0.1% by weight or higher, especially preferably 0.2% by weight or higher, and the upper limit thereof is generally 10% by weight or lower, preferably 5% by weight or lower, more preferably 3% by weight or lower, especially preferably 1% by weight or lower. By adding those auxiliaries, capacity-maintaining characteristics and cycle characteristics after high-temperature storage can be improved. However, when the proportion thereof is a concentration lower than the lower limit, there are cases where the auxiliaries bring about substantially no effect. Conversely, when the concentration thereof is too high, there are cases where battery characteristics such as high-load discharge characteristics decrease.

<Preparation of Electrolytic Solution>

The nonaqueous electrolytic solution of the invention can be prepared by dissolving in a nonaqueous solvent an electrolyte, the ingredients characteristics of each of various embodiments according to the invention, and other compounds, auxiliaries, etc. that are blended according to need. When the nonaqueous electrolytic solution of the invention is prepared, it is preferred that each raw material should be dehydrated beforehand in order to reduce the water content of the electrolytic solution to be obtained. It is preferred that each raw material should be dehydrated to a water content of generally 50 ppm or lower, preferably 30 ppm or lower, especially preferably 10 ppm or lower, before being used. It is also possible to perform dehydration, deacidification treatment, or the like after preparation of the electrolytic solution.

The nonaqueous electrolytic solution of the invention is suitable for use in nonaqueous-electrolyte batteries. Nonaqueous-electrolyte batteries having any configuration can be used in the invention. The nonaqueous electrolytic solution is especially suitable for use as an electrolytic solution for secondary batteries among the nonaqueous-electrolyte batteries, namely, for nonaqueous-electrolyte secondary batteries, e.g., lithium secondary batteries.

A nonaqueous-electrolyte secondary battery employing the nonaqueous electrolytic solution of the invention is explained below.

[Nonaqueous-Electrolyte Secondary Battery]

The nonaqueous-electrolyte secondary battery of the invention is a nonaqueous-electrolyte battery including a negative electrode and a positive electrode which are capable of occluding and releasing lithium ions and a nonaqueous electrolytic solution, and is characterized in that the nonaqueous electrolytic solution is the nonaqueous electrolytic solution of the invention described above.

<Battery Constitution>

The nonaqueous-electrolyte secondary battery according to the invention is a nonaqueous-electrolyte battery including a negative electrode and a positive electrode which are capable of occluding and releasing lithium ions and a nonaqueous electrolytic solution, like conventionally known nonaqueous-electrolyte secondary batteries, except that the battery according to the invention is produced using the nonaqueous electrolytic solution of the invention described above. Usually, the battery of the invention is obtained by placing a porous film impregnated with the nonaqueous electrolytic solution according to the invention between the positive electrode and the negative electrode in a case. The shape of the secondary battery according to the invention is not particularly limited, and may be any of the cylindrical type, prismatic type, laminate type, coin type, large type, and the like.

<Electrodes>

(Negative-Electrode Active Material)

The negative-electrode active material is not particularly limited so long as the active material is capable of occluding and releasing lithium ions. Examples thereof include carbonaceous materials, alloy materials, and lithium-containing metal composite oxide materials. Preferred of these are carbonaceous materials and alloy materials.

These negative-electrode active materials may be used alone or as a mixture of two or more thereof.

<Carbonaceous Materials>

Especially preferred of carbonaceous materials are graphites and carbonaceous materials obtained by coating the surface of a graphite with carbon which is more amorphous than the graphite.

The graphites preferably are ones having a d value (interlayer distance) of the lattice plane (002) of preferably 0.335-0.338 nm, more preferably 0.335-0.337 nm, when determined from X-ray diffraction according to the Gakushin-method. The crystallite size (Lc) determined from X-ray diffraction according to the Gakushin-method is generally 10 nm or larger, preferably 50 nm or larger, especially preferably 100 nm or larger. The ash content thereof is generally 1% by weight or lower, preferably 0.5% by weight or lower, especially preferably 0.1% by weight or lower.

The graphite whose surface is covered with amorphous carbon preferably includes a core material of graphite having a d value of the lattice plane (002) of 0.335-0.338 nm, determined from X-ray diffraction, and a carbonaceous material adhering on the surface of the core material and having a d value of the lattice plane (002) larger than that of the core material, determined from X-ray diffraction. The weight ratio of the core material and the carbonaceous material having a d value of the lattice plane (002) larger than that of the core material, determined from X-ray diffraction, is from 99/1 to 80/20. By using this material, a negative electrode which has a high capacity and hardly reacts with the electrolytic solution can be produced.

The particle diameters of the carbonaceous materials are generally 1 µm or larger, preferably 3 µm or larger, more preferably 5 µm or larger, most preferably 7 µm or larger, and are generally 100 µm or smaller, preferably 50 µm or smaller, more preferably 40 µm or smaller, most preferably 30 µm or smaller, in terms of median diameter determined by the laser diffraction/scattering method.

The carbonaceous materials have a specific surface area, as determined by the BET method, which is generally 0.3 $m^2/g$ or larger, preferably 0.5 $m^2/g$ or larger, more preferably 0.7 $m^2/g$ or larger, most preferably 0.8 $m^2/g$ or larger, and is generally 25.0 $m^2/g$ or smaller, preferably 20.0 $m^2/g$ or smaller, more preferably 15.0 $m^2/g$ or smaller, most preferably 10.0 $m^2/g$ or smaller.

Furthermore, the carbonaceous materials preferably are ones in which, when the materials are examined by Raman spectrometry using argon ion laser light and the peak intensity of a peak $P_A$ appearing in the range of 1,570-1,620 $cm^{-1}$ and the peak intensity of a peak $P_B$ appearing in the range of 1,300-1,400 $cm^{-1}$ are expressed by $I_A$ and $I_B$, respectively, then the value of R expressed by the ratio between $I_B$ and $I_A$ ($R=I_B/I_A$) is in the range of 0.01-0.7. Such carbonaceous materials preferably are ones in which the peak appearing in the range of 1,570-1,620 $cm^{-1}$ has a half-value width of 26 $cm^{-1}$ or smaller, especially 25 $cm^{-1}$ or smaller.

<Alloy Materials>

The alloy materials are not particularly limited so long as the materials are capable of occluding and releasing lithium. A pure metal and an alloy which form a lithium alloy, or any of compounds thereof, such as oxides, carbides, nitrides, silicides, sulfides, and phosphides may be used. Preferred are materials including an elemental metal and alloy which form a lithium alloy. More preferred are materials including a metallic or metalloid element in Groups 13 and 14 of the periodic table (i.e., carbon is excluded). Even more preferred are the pure metals of aluminum, silicon, and tin (hereinafter, these metals are often referred to as "specific metallic elements") and alloys or compounds containing these specific metallic elements.

Examples of a negative-electrode active material including at least one element selected from the specific metallic elements include: the pure metal which is any of the specific metallic elements; alloys constituted of two or more specific metallic elements; alloys constituted of one or more specific metallic elements and one or more other metallic elements; compounds containing one or more specific metallic elements; and composite compounds, such as oxides, carbides, nitrides, silicides, sulfides, or phosphides, of these compounds. By using one or more members selected from these elemental metals, alloys, and metal compounds as a negative-electrode active material, an increase in battery capacity can be attained.

Examples of the negative-electrode active material further include compounds formed by the complicated bonding of any of those composite compounds to one or more elemental metals or alloys or to several elements, e.g., nonmetallic elements. More specifically, in the case of silicon and tin, for example, an alloy of these elements with a metal which does not function as a negative electrode may be used. In the case of tin, for example, a complicated compound including a combination of five to six elements including tin, a metal which functions as a negative electrode and is not silicon, a metal which does not function as a negative electrode, and a nonmetallic element may be used.

Preferred of those negative-electrode active materials are the elemental metal which is any one of the specific metallic elements, alloys of two or more specific metallic elements, and oxides, carbides, nitrides, and other compounds of the specific metallic elements. This is because these negative-electrode active materials give a battery having a high capacity per unit weight. In particular, the elemental metal(s), alloys, oxides, carbides, nitrides, and the like of silicon and/or tin are preferred because these active materials have a high capacity per unit weight.

The following compounds containing silicon and/or tin are also preferred because these compounds bring about excellent cycle characteristics, although inferior in capacity per unit weight to the elemental metals or alloys thereof.

A silicon and/or tin oxide in which the elemental ratio of the silicon and/or tin to the oxygen is generally 0.5 or higher, preferably 0.7 or higher, more preferably 0.9 or higher, and is generally 1.5 or lower, preferably 1.3 or lower, more preferably 1.1 or lower.

A silicon and/or tin nitride in which the elemental ratio of the silicon and/or tin to the nitrogen is generally 0.5 or higher, preferably 0.7 or higher, more preferably 0.9 or higher, and is generally 1.5 or lower, preferably 1.3 or lower, more preferably 1.1 or lower.

A silicon and/or tin carbide in which the elemental ratio of the silicon and/or tin to the carbon is generally 0.5 or higher, preferably 0.7 or higher, more preferably 0.9 or higher, and is generally 1.5 or lower, preferably 1.3 or lower, more preferably 1.1 or lower.

These alloy materials may be ones in the form of a powder or thin film, and may be crystalline or amorphous.

The alloy materials are not particularly limited in average particle diameter from the standpoint of producing the effects of the invention. However, the average particle diameter of each alloy material is generally 50 μm or smaller, preferably 20 μm or smaller, especially preferably 10 μm or smaller, and is generally 0.1 μm or larger, preferably 1 μm or larger, especially preferably 2 μm or larger. In the case of an alloy material having an average particle diameter exceeding the upper limit, there is a possibility that electrode expansion might be enhanced, resulting in reduced cycle characteristics. In the case of an alloy material having an average particle diameter smaller than the lower limit, there is a possibility that current collection might be difficult, resulting in an insufficient capacity.

<Lithium-Containing Metal Composite Oxide Materials>

The lithium-containing metal composite oxide materials to be used as a negative-electrode active material are not particularly limited so long as the materials are capable of occluding and releasing lithium. However, lithium-containing composite metal oxide materials containing titanium are preferred, and composite oxides of lithium and titanium (hereinafter abbreviated to "lithium-titanium composite oxides") are more preferred.

Also preferred are lithium-titanium composite oxides in which the lithium or titanium has been replaced by one or more other metallic elements, e.g., at least one element selected from the group consisting of Na, K, Co, Al, Fe, Ti, Mg, Cr, Ga, Cu, Zn, and Nb.

Furthermore, lithium-titanium composite oxides which are represented by $Li_xTi_yM_zO_4$ wherein $0.7 \leq x \leq 1.5$, $1.5 \leq y \leq 2.3$, and $0 \leq z \leq 1.6$ are preferred because the structure thereof is stable during lithium ion occlusion and release (in the formula, M represents at least one element selected from the group consisting of Na, K, Co, Al, Fe, Ti, Mg, Cr, Ga, Cu, Zn, and Nb).

Of these, structures represented by $Li_xTi_yM_zO_4$ wherein
(a) $1.2 \leq x \leq 1.4$, $1.5 \leq y \leq 1.7$, and $z=0$
(b) $0.9 \leq x \leq 1.1$, $1.9 \leq y \leq 2.1$, and $z=0$ or
(c) $0.7 \leq x \leq 0.9$, $2.1 \leq y \leq 2.3$, and $z=0$
are especially preferred because they bring about a satisfactory balance among battery performances. Especially preferred representative compositions are: $Li_{4/3}Ti_{5/3}O_4$ for (a), $Li_1Ti_2O_4$ for (b), and $Li_{4/5}Ti_{11/5}O_4$ for (c).

Preferred examples of structures of $Li_xTi_yM_zO_4$ wherein z≠0 include $Li_{4/3}Ti_{4/3}Al_{1/3}O_4$.

(Positive-Electrode Active Material)

The positive-electrode active material is not particularly limited so long as the active material is capable of occluding and releasing lithium ions. The positive-electrode active material preferably is a substance containing lithium and at least one transition metal. Examples thereof include lithium-transition metal composite oxides and lithium-containing transition metal/phosphoric acid compounds.

The transition metal of the lithium-transition metal composite oxides preferably is V, Ti, Cr, Mn, Fe, Co, Ni, Cu, or the like. Specific examples of the oxides include lithium-cobalt composite oxides such as $LiCoO_2$, lithium-nickel composite oxides such as $LiNiO_2$, lithium-manganese composite oxides such as $LiMnO_2$, $LiMn_2O_4$, and $Li_2MnO_3$, and ones formed by partly replacing the transition metal atoms as a main component of these lithium-transition metal composite oxides by one or more other metals, e.g., Al, Ti, V, Cr, Mn, Fe, Co, Li, Ni, Cu, Zn, Mg, Ga, Zr, Si, etc. Examples of such compounds formed by the replacement include $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiMn_{1.8}Al_{0.2}O_4$, and $LiMn_{1.5}Ni_{0.5}O_4$.

The transition metal of the lithium-containing transition metal/phosphoric acid compounds preferably is V, Ti, Cr, Mn, Fe, Co, Ni, Cu, or the like. Specific examples of the compounds include iron phosphate compounds such as $LiFePO_4$, $Li_3Fe_2(PO_4)_3$, and $LiFeP_2O_7$, cobalt phosphate compounds such as $LiCoPO_4$, and ones formed by partly replacing the transition metal atoms as a main component of these lithium transition metal/phosphoric acid compounds by one or more other metals, e.g., Al, Ti, V, Cr, Mn, Fe, Co, Li, Ni, Cu, Zn, Mg, Ga, Zr, Nb, Si, etc.

These positive-electrode active materials may be used alone or in combination of two or more thereof.

Furthermore, a material having a composition different from that of the main material constituting the positive electrode active material may adhere on the surface of the positive electrode active material. Examples of the surface-adherent substance include oxides such as aluminum oxide, silicon oxide, titanium oxide, zirconium oxide, magnesium oxide, calcium oxide, boron oxide, antimony oxide, and bismuth oxide, sulfates such as lithium sulfate, sodium sulfate, potassium sulfate, magnesium sulfate, calcium sulfate, and aluminum sulfate, and carbonates such as lithium carbonate, calcium carbonate, and magnesium carbonate.

The amount of the surface-adherent substance is not particularly limited from the standpoint of producing the effects of the invention. However, the surface-adherent substance is used in such an amount that the lower limit thereof is preferably 0.1 ppm or larger, more preferably 1 ppm or larger, even more preferably 10 ppm or larger, and the upper limit thereof is preferably 20% or smaller, more preferably 10% or smaller, even more preferably 5% or smaller, in terms of mass amount based on the positive-electrode active material. The surface-adherent substance can inhibit the nonaqueous electrolytic solution from undergoing an oxidation reaction on the surface of the positive-electrode active material and can improve battery life. However, in case where the amount of the substance adherent to the active-material surface is too small, the effect thereof is not sufficiently produced. When the amount thereof is too large, there are cases where the adherent substance inhibits the movement of lithium ions, resulting in an increase in resistance.

(Binder, Thickener, Etc.)

As a binder for binding the active materials, any desired binder can be used so long as it is a material stable to the solvent to be used in electrode production and to the electrolytic solution. Examples thereof include fluororesins such as poly(vinylidene fluoride) and polytetrafluoroethylene, polyolefins such as polyethylene and polypropylene, polymers having unsaturated bonds and copolymers thereof, such as styrene/butadiene rubbers, isoprene rubber, and butadiene rubber, and acrylic acid polymers and copolymers thereof, such as ethylene/acrylic acid copolymers and ethylene/methacrylic acid copolymers. These may be used alone or in combination of two or more thereof.

A thickener, conductive material, filler, etc. may be incorporated into the electrodes in order to enhance mechanical strength or electrical conductivity.

Examples of the thickener include carboxymethyl cellulose, methyl cellulose, hydroxymethyl cellulose, ethyl cellulose, poly(vinyl alcohol), oxidized starch, phosphorylated starch, and gasein. These may be used alone or in combination of two or more thereof.

Examples of the conductive material include a metallic material such as copper or nickel and a carbon material such as a graphite or carbon black. These may be used alone or in combination of two or more thereof.

(Production of Electrodes)

The electrodes may be produced by an ordinary method. For example, each electrode can be formed by adding a binder, thickener, conductive material, solvent, etc. to a negative-electrode or positive-electrode active material to obtain a slurry, applying the slurry to a current collector, drying the slurry applied, and then pressing the coated current collector.

It is also possible to use a method in which a mixture prepared by adding a binder, conductive material, etc. to an active material is directly rolled to obtain a sheet electrode or compression-molded to obtain a pellet electrode. Furthermore, a thin film of an electrode material may be formed on a current collector by a technique such as vapor deposition, sputtering, or plating.

In the case where a graphite was used as a negative-electrode active material, the negative-electrode active-material layer which has been dried and pressed has a density of generally 1.45 $g/cm^3$ or higher, preferably 1.55 $g/cm^3$ or higher, more preferably 1.60 $g/cm^3$ or higher, especially preferably 1.65 $g/cm^3$ or higher.

The positive-electrode active-material layer which has been dried and pressed has a density of generally 2.0 $g/cm^3$ or higher, preferably 2.5 $g/cm^3$ or higher, more preferably 3.0 $g/cm^3$ or higher.

(Current Collector)

Various kinds of current collectors can be used. Usually, however, a metal or an alloy is used. Examples of current collectors for the negative electrode include copper, nickel, and stainless steel, of which copper is preferred. Examples of current collectors for the positive electrode include metals such as aluminum, titanium, and tantalum or alloys of these, and aluminum or alloys thereof are preferred.

<Separator and Case>

A porous film (separator) is interposed between the positive electrode and the negative electrode in order to prevent short-circuiting. In this case, the electrolytic solution is infiltrated into the porous film. The material and shape of the porous film are not particularly limited so long as the porous film is stable to the electrolytic solution and has excellent liquid retentivity. Preferred is a porous sheet, nonwoven fabric, or the like produced from a polyolefin, such as polyethylene or polypropylene, as a raw material.

Any materials can be used for the outer package of the battery according to the invention, and examples thereof include iron plated with nickel, stainless steel, aluminum and alloys thereof, nickel, titanium, laminated films.

The operating voltage of the nonaqueous-electrolyte secondary battery of the invention described above is generally in the range of from 2 V to 4.9 V.

EXAMPLES

The invention will be explained below in more detail by reference to Examples and Comparative Examples. However, the invention should not be construed as being limited to the Examples unless the invention departs from the gist thereof.

Methods of evaluating the batteries obtained in the following Examples and Comparative Examples are shown below.

[Capacity Evaluation]

At 25° C., a nonaqueous-electrolyte secondary battery which was kept in the state of being sandwiched between glass plates so as to attain enhanced close contact between the electrodes was charged to 4.2 V at a constant current corresponding to 0.2 C and then discharged to 3 V at a constant current corresponding to 0.2 C. This operation as one cycle was repeated to conduct three cycles and thereby stabilize the battery. In the fourth cycle, the battery was charged to 4.2 V at a constant current of 0.5 C, subsequently charged at a constant voltage of 4.2 V until the current value became 0.05 C, and then discharged to 3 V at a constant current of 0.2 C to determine the initial discharge capacity.

Here, "1 C" means the value of current at which the reference capacity of a battery is discharged for 1 hour, and "0.2 C" means the current value which is one-fifth of that current value.

[Evaluation of Overcharge Characteristics]

A battery which had undergone the capacity evaluation test was immersed in an ethanol bath to measure the volume thereof. Thereafter, at 25° C., this battery was charged to 5 V at a constant current of 0.2 C and, at the time when the voltage reached 5 V, the current was cut to measure the open-circuit voltage (OCV) of the battery which had undergone the overcharge test.

Subsequently, this battery was immersed in an ethanol bath to measure the volume thereof. The amount of a gas evolved was determined from the volume change through the overcharge.

Batteries having a lower OCV after the overcharge test have a lower overcharge depth and higher safety during overcharge.

Furthermore, the larger the amount of a gas generating after overcharge, the more the battery is preferred in the case where the battery is of the type in which an abnormal increase in internal pressure due to an abnormality, e.g., overcharge, is sensed to make the safety value work. This is because the safety valve in this battery can be made to work earlier.

Moreover, larger differences between the amount of a gas generating after overcharge and the amount of a gas generating during high-temperature storage, etc. are preferred because the safety valve can be prevented from working in error during high-temperature storage, etc., while enabling the safety valve to work upon overcharge without fail.

[Evaluation of High-Temperature Storability (Continuous-Charge Characteristics)]

A battery which had undergone the capacity evaluation test was immersed in an ethanol bath to measure the volume thereof. Thereafter, at 60° C., this battery was charged at a constant current of 0.5 C and, after the voltage reached 4.25 V, the charge was shifted to constant-voltage charge and the battery was continuously charged for 1 week.

The battery was cooled and then immersed in an ethanol bath to measure the volume thereof. The amount of a gas evolved was determined from the volume change through the continuous charge.

After the determination of the amount of a gas evolved, the battery was discharged at 25° C. to 3 V at a constant current of 0.2 C to measure the capacity remaining after the continuous charge test. The proportion of the discharge capacity after the continuous charge test to the initial discharge capacity was determined, and this proportion was taken as "residual capacity (%) after continuous charge test".

Subsequently, at 25° C., the battery was charged to 4.2 V at a constant current of 0.5 C, subsequently charged at a constant voltage of 4.2 V until the current value became 0.05 C, and then discharged to 3 V at a constant current of 1-C to measure the 1-C discharge capacity of the battery which had undergone the continuous charge test. The proportion of the 1-C discharge capacity after the continuous charge test to the initial discharge capacity was determined, and this proportion was taken as "1-C capacity (%) after continuous charge test".

Example 1-1

[Production of Negative Electrode]

Ninety-four parts by weight of a natural-graphite powder which had a d value of the lattice plane (002) and a crystallite size (Lc), both determined from X-ray diffraction, of 0.336 nm and 652 nm, respectively, an ash content of 0.07 parts by weight, a median diameter as determined by the laser diffraction/scattering method of 12 µm, a specific surface area as determined by the BET method of 7.5 m$^2$/g, and a value of R (=$I_B/I_A$) and a half-value width of the peak appearing in the range of 1,570-1,620 cm$^{-1}$, both determined by Raman spectrometry using argon ion laser light, of 0.12 and 19.9 cm$^{-1}$, respectively, was mixed with 6 parts by weight of poly(vinylidene fluoride). N-Methyl-2-pyrrolidone was added thereto to form slurry. This slurry was evenly applied to one side of a copper foil having a thickness of 12 µm and dried, and the resultant coated foil was pressed so as to result in a negative-electrode active-material layer having a density of 1.67 g/cm$^3$. Thus, a negative electrode was obtained.

[Production of Positive Electrode]

Ninety parts by weight of LiCoO$_2$ was mixed with 4 parts by weight of carbon black and 6 parts by weight of poly(vinylidene fluoride) (trade name "KF-1000", manufactured by Kureha Chemical Industry Co., Ltd.). N-Methyl-2-pyrrolidone was added thereto to form slurry. This slurry was evenly applied to both sides of an aluminum foil having a thickness of 15 µm and dried. The resultant coated foil was pressed so as to result in a positive-electrode active-material layer having a density of 3.2 g/cm$^3$. Thus, a positive electrode was obtained.

[Production of Electrolytic Solution]

In a dry argon atmosphere, a mixture of ethylene carbonate, ethyl methyl carbonate, and dimethyl carbonate (volume ratio, 2:3:3) was mixed with 2% by weight vinylene carbonate and 1% by weight methyl phenyl carbonate in terms of the contents in the nonaqueous electrolytic solution. Subsequently, sufficiently dried LiPF$_6$ was dissolved therein in such an amount as to result in a proportion thereof of 1.0 mol/L. Thus, an electrolytic solution was obtained.

[Production of Lithium Secondary Battery]

The positive electrode and negative electrode described above and a separator made of polyethylene were stacked in the order of negative electrode/separator/positive electrode/separator/negative electrode to produce a battery element. This battery element was inserted into a bag composed of a laminated film of an aluminum sheet (thickness, 40 µm) coated with resin layers on both sides, while providing the terminals of the positive and negative electrodes in a protruding condition. Thereafter, the electrolytic solution was injected into the bag, which was vacuum-sealed to produce a sheet battery. This battery was evaluated for overcharge characteristics and continuous-charge characteristics. The results of the evaluation are shown in Table 2.

Example 1-2

A sheet-form lithium secondary battery was produced in the same manner as in Example 1, except that 0.5% by weight lithium difluorophosphate was used in place of the 2% by weight vinylene carbonate in the electrolytic solution of Example 1-1. This battery was evaluated for overcharge characteristics and continuous-charge characteristics. The results of the evaluation are shown in Table 2.

Example 1-3

A sheet-form lithium secondary battery was produced in the same manner as in Example 1-1, except that 0.5% by weight lithium difluorophosphate was further added to the electrolytic solution of Example 1-1. This battery was evaluated for overcharge characteristics and continuous-charge characteristics. The results of the evaluation are shown in Table 2.

Example 1-4

A sheet-form lithium secondary battery was produced in the same manner as in Example 1-1, except that the used electrolytic solution was prepared by mixing a mixture of ethylene carbonate, ethyl methyl carbonate, and dimethyl carbonate (volume ratio, 2:3:3) with 1% by weight 4-t-butylphenyl methyl carbonate in terms of the content in the nonaqueous electrolytic solution and then dissolving sufficiently dried LiPF$_6$ therein in such an amount as to result in a proportion thereof of 1.0 mol/L. This battery was evaluated for overcharge characteristics and continuous-charge characteristics. The results of the evaluation are shown in Table 2.

Example 1-5

A sheet-form lithium secondary battery was produced in the same manner as in Example 1-1, except that the used electrolytic solution was prepared by mixing a mixture of ethylene carbonate, ethyl methyl carbonate, and dimethyl carbonate (volume ratio, 2:3:3) with 2% by weight vinylene carbonate and 1% by weight 2-cyclohexylphenyl methyl carbonate in terms of the contents in the nonaqueous electrolytic solution and then dissolving sufficiently dried LiPF$_6$ therein in such an amount as to result in a proportion thereof of 1.0 mol/L. This battery was evaluated for overcharge characteristics and continuous-charge characteristics. The results of the evaluation are shown in Table 2.

Comparative Example 1-1

A sheet-form lithium secondary battery was produced in the same manner as in Example 1-1, except that the used electrolytic solution was prepared by mixing a mixture of ethylene carbonate, ethyl methyl carbonate, and dimethyl carbonate (volume ratio, 2:3:3) with 2% by weight vinylene carbonate in terms of the content in the nonaqueous electrolytic solution and then dissolving sufficiently dried LiPF$_6$ therein in such an amount as to result in a proportion thereof of 1.0 mol/L. This battery was evaluated for overcharge characteristics and continuous-charge characteristics. The results of the evaluation are shown in Table 2.

Comparative Example 1-2

A sheet-form lithium secondary battery was produced in the same manner as in Example 1-1, except that phenylcyclohexane was used in place of the methyl phenyl carbonate in the electrolytic solution of Example 1-1. This battery was evaluated for overcharge characteristics and continuous-charge characteristics. The results of the evaluation are shown in Table 2.

Comparative Example 1-3

A sheet-form lithium secondary battery was produced in the same manner as in Example 1-1, except that vinylene carbonate was omitted in the electrolytic solution of Example 1-1. This battery was evaluated for overcharge characteristics and continuous-charge characteristics. The results of the evaluation are shown in Table 2.

Comparative Example 1-4

A sheet-form lithium secondary battery was produced in the same manner as in Example 1-1, except that vinylene carbonate and methyl phenyl carbonate were omitted in the electrolytic solution of Example 1-1. This battery was evaluated for overcharge characteristics and continuous-charge characteristics. The results of the evaluation are shown in Table 2.

Comparative Example 1-5

A sheet-form lithium secondary battery was produced in the same manner as in Example 1-1, except that the used electrolytic solution was prepared in a dry argon atmosphere by mixing a mixture of ethylene carbonate, ethyl methyl carbonate, and dimethyl carbonate (volume ratio, 2:3:3) with 1% by weight 4-methylphenyl methyl carbonate and then dissolving sufficiently dried LiPF$_6$ therein in such an amount as to result in a proportion thereof of 1.0 mol/L. This battery was evaluated for overcharge characteristics and continuous-charge characteristics.

Comparative Example 1-6

A sheet-form lithium secondary battery was produced in the same manner as in Example 1-1, except that the used electrolytic solution was prepared in a dry argon atmosphere by mixing a mixture of ethylene carbonate, ethyl methyl carbonate, and dimethyl carbonate (volume ratio, 2:3:3) with 2% by weight vinylene carbonate and 1% by weight 4-methylphenyl methyl carbonate and then dissolving sufficiently dried LiPF$_6$ therein in such an amount as to result in a proportion thereof of 1.0 mol/L. This battery was evaluated for overcharge characteristics and continuous-charge characteristics.

TABLE 1

Compositions of electrolytic solutions of Examples and Comparative Examples

| | Compound represented by general formula (1) or compound represented by general formula (2) or comparative compound | | Other compound | |
|---|---|---|---|---|
| | Kind | Amount (wt %) | Kind | Amount (wt %) |
| Example 1-1 | methyl phenyl carbonate | 1 | vinylene carbonate | 2 |
| Example 1-2 | methyl phenyl carbonate | 1 | lithium difluorophosphate | 0.5 |
| Example 1-3 | methyl phenyl carbonate | 1 | vinylene carbonate | 2 |
| | | | lithium difluorophosphate | 0.5 |
| Example 1-4 | 4-t-butylphenyl methyl carbonate | 1 | — | |
| Example 1-5 | 2-cyclohexylphenyl methyl carbonate | 1 | vinylene carbonate | 2 |
| Compartive Example 1-1 | — | — | vinylene carbonate | 2 |

TABLE 1-continued

Compositions of electrolytic solutions of
Examples and Comparative Examples

| | Compound represented by general formula (1) or compound represented by general formula (2) or comparative compound | | Other compound | |
|---|---|---|---|---|
| | Kind | Amount (wt %) | Kind | Amount (wt %) |
| Comparative Example 1-2 | phenylcyclohexane | 1 | vinylene carbonate | 2 |
| Comparative Example 1-3 | methyl phenyl carbonate | 1 | — | — |
| Comparative Example 1-4 | — | — | — | — |
| Comparative Example 1-5 | 4-methylphenyl methyl carbonate | 1 | — | — |
| Comparative Example 1-6 | 4-methylphenyl methyl carbonate | 1 | vinylene carbonate | 2 |

TABLE 2

Results of evaluation of overcharge characteristics
and continuous-charge characteristics

| | Amount of gas generating after overcharge (mL) | OCV after overcharge (V) | Amount of gas generating after continuous charge (mL) | Residual capacity after continuous charge (%) |
|---|---|---|---|---|
| Example 1-1 | 0.92 | 4.44 | 0.48 | 97 |
| Example 1-2 | 0.27 | 4.46 | 0.26 | 97 |
| Example 1-3 | 1.03 | 4.45 | 0.48 | 98 |
| Example 1-4 | 0.28 | 4.51 | 0.27 | 97 |
| Example 1-5 | 1.22 | 4.44 | 0.48 | 98 |
| Comparative Example 1-1 | 0.13 | 4.54 | 0.53 | 97 |
| Comparative Example 1-2 | 0.63 | 4.49 | 1.01 | 82 |
| Comparative Example 1-3 | 0.24 | 4.52 | 0.29 | 92 |
| Comparative Example 1-4 | 0.1 | 4.61 | 0.29 | 95 |
| Comparative Example 1-5 | 0.22 | 4.56 | 0.63 | 85 |
| Comparative Example 1-6 | 0.50 | 4.52 | 1.74 | 71 |

As apparent from Table 2, the batteries of Comparative Examples 1-1 and 1-4 are considered to have low safety during overcharge, although these batteries have excellent battery characteristics after high-temperature storage. The batteries of Comparative Examples 1-2, 1-3, 1-5, and 1-6 have considerably deteriorated battery characteristics after high-temperature storage although high in safety during overcharge. It can be seen that the batteries according to the invention have high safety during overcharge and excellent high-temperature storability.

Example 2-1

<Production of Negative Electrode>

Ninety-four parts by weight of a natural-graphite powder which had a d value of the lattice plane (002) and a crystallite size (Lc), both determined from X-ray diffraction, of 0.336 nm and 652 nm, respectively, an ash content of 0.07% by weight, a median diameter as determined by the laser diffraction/scattering method of 12 μm, a specific surface area as determined by the BET method of 7.5 m$^2$/g, and a value of R ($=I_B/I_A$) and a half-value width of the peak appearing in the range of 1,570-1,620 cm$^{-1}$, both determined by Raman spectrometry using argon ion laser light, of 0.12 and 19.9 cm$^{-1}$, respectively, was mixed with 6 parts by weight of poly(vinylidene fluoride). N-Methyl-2-pyrrolidone was added thereto to form slurry. This slurry was evenly applied to one side of a copper foil having a thickness of 12 μm and dried, and the resultant coated foil was pressed so as to result in a negative-electrode active-material layer having a density of 1.67 g/cm$^3$. Thus, a negative electrode was obtained.

<Production of Positive Electrode>

Ninety parts by weight of LiCoO$_2$ was mixed with 4 parts by weight of carbon black and 6 parts by weight of poly(vinylidene fluoride) (trade name "KF-1000", manufactured by Kureha Chemical Industry Co., Ltd.). N-Methyl-2-pyrrolidone was added thereto to form slurry. This slurry was evenly applied to both sides of an aluminum foil having a thickness of 15 μm and dried. The resultant coated foil was pressed so as to result in a positive-electrode active-material layer having a density of 3.2 g/cm$^3$. Thus, a positive electrode was obtained.

<Production of Electrolytic Solution>

In a dry argon atmosphere, a mixture of ethylene carbonate, ethyl methyl carbonate, and dimethyl carbonate (volume ratio, 2:3:3) was mixed with 2% by weight vinylene carbonate and 1% by weight diphenyl carbonate in terms of the contents in the nonaqueous electrolytic solution. Subsequently, sufficiently dried LiPF$_6$ was dissolved therein in such an amount as to result in a proportion thereof of 1.0 mol/L. Thus, an electrolytic solution was obtained.

Production of Lithium Secondary Battery

The positive electrode and negative electrode described above and a separator made of polyethylene were stacked in the order of negative electrode/separator/positive electrode/separator/negative electrode to produce a battery element. This battery element was inserted into a bag composed of a laminated film of an aluminum sheet (thickness, 40 μm) coated with resin layers on both sides, while providing the terminals of the positive and negative electrodes in a protruding condition. Thereafter, the electrolytic solution was injected into the bag, which was vacuum-sealed to produce a sheet-form lithium secondary battery. This battery was evaluated for overcharge characteristics and continuous-charge characteristics. The results of the evaluation are shown in Table 3.

Example 2-2

A sheet-form lithium secondary battery was produced in the same manner as in Example 2-1, except that fluoroethylene carbonate was used in place of the vinylene carbonate in the electrolytic solution of Example 2-1. This battery was evaluated for overcharge characteristics and continuous-charge characteristics. The results of the evaluation are shown in Table 3.

Example 2-3

A sheet-form lithium secondary battery was produced in the same manner as in Example 2-1, except that the used electrolytic solution was prepared by mixing a mixture of ethylene carbonate, ethyl methyl carbonate, and dimethyl carbonate (volume ratio, 2:3:3) with 2% by weight vinylene carbonate, 0.5% by weight lithium difluorophosphate, and 1% by weight diphenyl carbonate in terms of the contents in the nonaqueous electrolytic solution and then dissolving sufficiently dried $LiPF_6$ therein in such an amount as to result in a proportion thereof of 1.0 mol/L. This battery was evaluated for overcharge characteristics and continuous-charge characteristics. The results of the evaluation are shown in Table 3.

Comparative Example 2-1

A sheet-form lithium secondary battery was produced in the same manner as in Example 2-1, except that the used electrolytic solution was prepared by mixing a mixture of ethylene carbonate, ethyl methyl carbonate, and dimethyl carbonate (volume ratio, 2:3:3) with 2% by weight vinylene carbonate in terms of the content in the nonaqueous electrolytic solution and then dissolving sufficiently dried $LiPF_6$ therein in such an amount as to result in a proportion thereof of 1.0 mol/L. This battery was evaluated for overcharge characteristics and continuous-charge characteristics. The results of the evaluation are shown in Table 3.

Comparative Example 2-2

A sheet-form lithium secondary battery was produced in the same manner as in Example 1, except that phenylcyclohexane was used in place of the diphenyl carbonate in the electrolytic solution of Example 2-1. This battery was evaluated for overcharge characteristics and continuous-charge characteristics. The results of the evaluation are shown in Table 3.

Comparative Example 2-3

A sheet-form lithium secondary battery was produced in the same manner as in Example 2-1, except that vinylethylene carbonate was used in place of the vinylene carbonate in the electrolytic solution of Example 2-1. This battery was evaluated for overcharge characteristics and continuous-charge characteristics. The results of the evaluation are shown in Table 3.

Comparative Example 2-4

A sheet-form lithium secondary battery was produced in the same manner as in Example 2-1, except that the used electrolytic solution was prepared by mixing a mixture of ethylene carbonate, ethyl methyl carbonate, and dimethyl carbonate (volume ratio, 2:3:3) with 1% by weight diphenyl carbonate in terms of the content in the nonaqueous electrolytic solution and then dissolving sufficiently dried $LiPF_6$ therein in such an amount as to result in a proportion thereof of 1.0 mol/L. This battery was evaluated for overcharge characteristics and continuous-charge characteristics. The results of the evaluation are shown in Table 3.

Comparative Example 2-5

A sheet-form lithium secondary battery was produced in the same manner as in Example 2-1, except that the used electrolytic solution was prepared by dissolving sufficiently dried $LiPF_6$ in a mixture of ethylene carbonate, ethyl methyl carbonate, and dimethyl carbonate (volume ratio, 2:3:3) in such an amount as to result in a proportion thereof of 1.0 mol/L. This battery was evaluated for overcharge characteristics and continuous-charge characteristics. The results of the evaluation are shown in Table 3.

Comparative Example 2-6

A sheet-form lithium secondary battery was produced in the same manner as in Example 2-1, except that the used electrolytic solution was prepared in a dry argon atmosphere by mixing a mixture of ethylene carbonate, ethyl methyl carbonate, and dimethyl carbonate (volume ratio, 6:1:3) with 2% by weight vinylene carbonate and 1% by weight diphenyl carbonate in terms of the contents in the nonaqueous electrolytic solution and then dissolving sufficiently dried $LiPF_6$ therein in such an amount as to result in a proportion thereof of 1.0 mol/L. This battery was evaluated for overcharge characteristics and continuous-charge characteristics. The results of the evaluation are shown in Table 3.

TABLE 3

| | Composition of nonaqueous electrolytic solution | | | | Results of evaluation of overcharge characteristics and continuous-charge characteristics | | | | |
|---|---|---|---|---|---|---|---|---|---|
| | Diphenyl carbonate or comparative compound | | Compound (b) or comparative compound | | Amount of gas generating after overcharge (mL) | OCV after overcharge (V) | Amount of gas generating after continuous charge (mL) | Residual capacity after continuous charge (%) | 1-C capacity after continuous charge (%) |
| | Kind | Amount (parts by weight) | Kind | Amount (parts by weight) | | | | | |
| Example 2-1 | diphenyl carbonate | 1 | vinylene carbonate | 2 | 0.58 | 4.46 | 0.51 | 97 | 63 |
| Example 2-2 | diphenyl carbonate | 1 | fluoroethylene carbonate | 2 | 0.48 | 4.47 | 0.47 | 95 | 62 |
| Example 2-3 | diphenyl carbonate | 1 | vinylene carbonate lithium difluorophosphate | 2 0.5 | 0.63 | 4.48 | 0.45 | 97 | 64 |
| Comparative Example 2-1 | — | — | vinylene carbonate | 2 | 0.13 | 4.54 | 0.53 | 97 | 63 |
| Comparative Example 2-2 | phenylcyclohexane | 1 | vinylene carbonate | 2 | 0.63 | 4.49 | 1.01 | 82 | 24 |
| Comparative Example 2-3 | diphenyl carbonate | 1 | vinylethylene carbonate | 2 | 0.12 | 4.52 | 0.22 | 91 | 5 |
| Comparative Example 2-4 | diphenyl carbonate | 1 | — | — | 0.13 | 4.51 | 0.28 | 92 | 42 |
| Comparative Example 2-5 | — | — | — | — | 0.1 | 4.61 | 0.29 | 95 | 53 |
| Comparative Example 2-6 | diphenyl carbonate | 1 | vinylene carbonate | 2 | 0.6 | 4.45 | 0.66 | 92 | 46 |

The following are apparent from Table 3.

The battery of Comparative Example 2-2, which employs an electrolytic solution containing phenylcyclohexane in place of diphenyl carbonate, shows enhanced gas evolution during high-temperature storage and considerable deterioration of battery characteristics, although high in safety during overcharge.

The batteries of Comparative Examples 2-3 and 2-4, in which the electrolytic solutions do not contain compound (b), show considerable deterioration of battery characteristics although reduced in gas evolution during high-temperature storage.

The batteries of Comparative Examples 2-1 and 2-5, in which the electrolytic solutions do not contain diphenyl carbonate, are considered to be low in safety during overcharge, although these batteries show excellent battery characteristics after high-temperature storage.

The battery of Comparative Example 2-6, in which the electrolytic solution does not contain the specific nonaqueous solvent, shows enhanced gas evolution during high-temperature storage and suffers considerable deterioration of battery characteristics. In contrast, it can be seen that the batteries employing the electrolytic solutions according to the invention, in which diphenyl carbonate is used in combination with compound (b), have high safety during overcharge and excellent high-temperature storability.

Example 3-1

[Production of Negative Electrode]

Ninety-four parts by weight of a natural-graphite powder which had a d value of the lattice plane (002) and a crystallite size (Lc), both determined from X-ray diffraction, of 0.336 nm and 652 nm, respectively, an ash content of 0.07 parts by weight, a median diameter as determined by the laser diffraction/scattering method of 12 μm, a specific surface area as determined by the BET method of 7.5 m$^2$/g, and a value of R ($=I_B/I_A$) and a half-value width of the peak appearing in the range of 1,570-1,620 cm$^{-1}$, both determined by Raman spectrometry using argon ion laser light, of 0.12 and 19.9 cm$^{-1}$, respectively, was mixed with 6 parts by weight of poly(vinylidene fluoride). N-Methyl-2-pyrrolidone was added thereto to form slurry. This slurry was evenly applied to one side of a copper foil having a thickness of 12 μm and dried, and the resultant coated foil was pressed so as to result in a negative-electrode active-material layer having a density of 1.67 g/cm$^3$. Thus, a negative electrode was obtained.

[Production of Positive Electrode]

Ninety parts by weight of LiCoO$_2$ was mixed with 4 parts by weight of carbon black and 6 parts by weight of poly (vinylidene fluoride) (trade name "KF-1000", manufactured by Kureha Chemical Industry Co., Ltd.). N-Methyl-2-pyrrolidone was added thereto to form slurry. This slurry was evenly applied to both sides of an aluminum foil having a thickness of 15 μm and dried. The resultant coated foil was pressed so as to result in a positive-electrode active-material layer having a density of 3.2 g/cm$^3$. Thus, a positive electrode was obtained.

[Production of Electrolytic Solution]

In a dry argon atmosphere, a mixture of ethylene carbonate, ethyl methyl carbonate, and dimethyl carbonate (volume ratio, 2:3:3) was mixed with 2% by weight vinylene carbonate and 1% by weight tris(4-t-butylphenyl)phosphate in terms of the contents in the nonaqueous electrolytic solution. Subsequently, sufficiently dried LiPF$_6$ was dissolved therein in such an amount as to result in a proportion thereof of 1.0 mol/L. Thus, an electrolytic solution was obtained.

[Production of Lithium Secondary Battery]

The positive electrode and negative electrode described above and a separator made of polyethylene were stacked in the order of negative electrode/separator/positive electrode/separator/negative electrode to produce a battery element. This battery element was inserted into a bag composed of a laminated film of an aluminum sheet (thickness, 40 μm) coated with resin layers on both sides, while providing the terminals of the positive and negative electrodes in a protruding condition. Thereafter, the electrolytic solution was injected into the bag, which was vacuum-sealed to produce a sheet battery. This battery was evaluated for overcharge characteristics and continuous-charge characteristics. The results of the evaluation are shown in Table 5.

Example 3-2

A sheet-form lithium secondary battery was produced in the same manner as in Example 3-1, except that tris(4-cyclohexylphenyl)phosphate was used in place of the tris(4-t-butylphenyl)phosphate in the electrolytic solution of Example 3-1. This battery was evaluated for overcharge characteristics and continuous-charge characteristics. The results of the evaluation are shown in Table 5.

Example 3-3

A sheet-form lithium secondary battery was produced in the same manner as in Example 3-1, except that 4-t-butylphenyl acetate was used in place of the tris(4-t-butylphenyl) phosphate in the electrolytic solution of Example 3-1. This battery was evaluated for overcharge characteristics and continuous-charge characteristics. The results of the evaluation are shown in Table 5.

Example 3-4

A sheet-form lithium secondary battery was produced in the same manner as in Example 3-1, except that methyl 4-t-butylbenzoate was used in place of the tris(4-t-butylphenyl) phosphate in the electrolytic solution of Example 3-1. This battery was evaluated for overcharge characteristics and continuous-charge characteristics. The results of the evaluation are shown in Table 5.

Example 3-5

A sheet-form lithium secondary battery was produced in the same manner as in Example 3-1, except that the used electrolytic solution was prepared by mixing a mixture of ethylene carbonate, ethyl methyl carbonate, and dimethyl carbonate (volume ratio, 2:3:3) with 2% by weight vinylene carbonate, 0.5% by weight lithium difluorophosphate, and 1% by weight tris(4-t-butylphenyl)phosphate in terms of the contents in the nonaqueous electrolytic solution and then dissolving sufficiently dried $LiPF_6$ therein in such an amount as to result in a proportion thereof of 1.0 mol/L. This battery was evaluated for overcharge characteristics and continuous-charge characteristics. The results of the evaluation are shown in Table 5.

Comparative Example 3-1

A sheet-form lithium secondary battery was produced in the same manner as in Example 3-1, except that the used electrolytic solution was prepared by mixing a mixture of ethylene carbonate, ethyl methyl carbonate, and dimethyl carbonate (volume ratio, 2:3:3) with 2% by weight vinylene carbonate in terms of the content in the nonaqueous electrolytic solution and then dissolving sufficiently dried $LiPF_6$ therein in such an amount as to result in a proportion thereof of 1.0 mol/L. This battery was evaluated for overcharge characteristics and continuous-charge characteristics. The results of the evaluation are shown in Table 5.

Comparative Example 3-2

A sheet-form lithium secondary battery was produced in the same manner as in Example 3-1, except that phenylcyclohexane was used in place of the tris(4-t-butylphenyl)phosphate in the electrolytic solution of Example 3-1. This battery was evaluated for overcharge characteristics and continuous-charge characteristics. The results of the evaluation are shown in Table 5.

Comparative Example 3-3

A sheet-form lithium secondary battery was produced in the same manner as in Example 3-1, except that triphenyl phosphate was used in place of the tris(4-t-butylphenyl)phosphate in the electrolytic solution of Example 3-1. This battery was evaluated for overcharge characteristics and continuous-charge characteristics. The results of the evaluation are shown in Table 5.

Comparative Example 3-4

A sheet-form lithium secondary battery was produced in the same manner as in Example 3-1, except that tris(4-methylphenyl)phosphate was used in place of the tris(4-t-butylphenyl)phosphate in the electrolytic solution of Example 3-1. This battery was evaluated for overcharge characteristics and continuous-charge characteristics. The results of the evaluation are shown in Table 5.

TABLE 4

| Compositions of electrolytic solutions | | | | |
|---|---|---|---|---|
| Phosphoric ester compound of the invention, carboxylic ester compound of the invention, or comparative compound | | | Other compound | |
| | Kind | Amount (parts by weight) | Kind | Amount (parts by weight) |
| Example 3-1 | 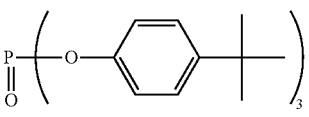 | 1 | vinylene carbonate | 2 |
| Example 3-2 | 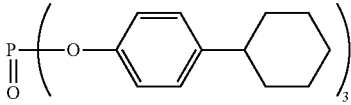 | 1 | vinylene carbonate | 2 |

TABLE 4-continued

Compositions of electrolytic solutions

| | Phosphoric ester compound of the invention, carboxylic ester compound of the invention, or comparative compound | | Other compound | |
|---|---|---|---|---|
| | Kind | Amount (parts by weight) | Kind | Amount (parts by weight) |
| Example 3-3 | 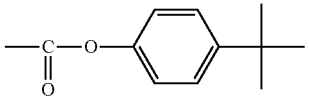 | 1 | vinylene carbonate | 2 |
| Example 3-4 | 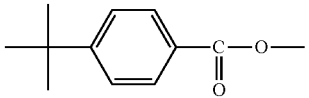 | 1 | vinylene carbonate | 2 |
| Example 3-5 | 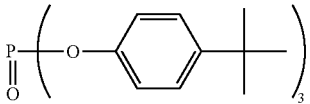 | 1 | vinylene carbonate<br>lithium difluorophosphate | 2<br>0.5 |
| Comparative Example 3-1 | — | — | vinylene carbonate | 2 |
| Comparative Example 3-2 | 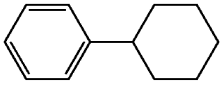 [SMILES: c1ccc(C2CCCCC2)cc1] | 1 | vinylene carbonate | 2 |
| Comparative Example 3-3 | 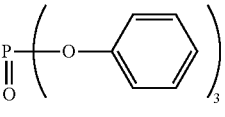 | 1 | vinylene carbonate | 2 |
| Comparative Example 3-4 | 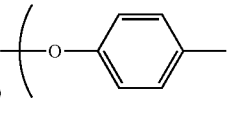 | 1 | vinylene carbonate | 2 |

TABLE 5

Results of evaluation of overcharge characteristics and continuous-charge characteristics

| | Amount of gas generating after overcharge (mL) | OCV after overcharge (V) | Amount of gas generating after continuous charge (mL) | Residual capacity after continuous charge (%) |
|---|---|---|---|---|
| Example 3-1 | 0.83 | 4.46 | 0.52 | 97 |
| Example 3-2 | 0.59 | 4.49 | 0.54 | 96 |
| Example 3-3 | 0.32 | 4.50 | 0.56 | 91 |
| Example 3-4 | 0.28 | 4.52 | 0.64 | 97 |
| Example 3-5 | 0.89 | 4.47 | 0.52 | 98 |
| Comparative Example 3-1 | 0.13 | 4.54 | 0.53 | 97 |
| Comparative Example 3-2 | 0.63 | 4.49 | 1.01 | 82 |
| Comparative Example 3-3 | 0.14 | 4.53 | 0.51 | 97 |
| Comparative Example 3-4 | 0.14 | 4.55 | 0.53 | 95 |

As apparent from Table 5, the batteries of Comparative Examples 3-1, 3-3, and 3-4 are low in safety during overcharge although these batteries have excellent battery characteristics after high-temperature storage. The battery of Comparative Example 3-2 shows considerable deterioration of battery characteristics through high-temperature storage, although high in safety during overcharge. It can therefore be seen that the batteries employing the nonaqueous electrolytic solutions according to the invention have high safety during overcharge and excellent high-temperature storability.

This application is based on a Japanese patent application filed on Feb. 29, 2008 (Application No. 2008-049154), a Japanese patent application filed on Jun. 6, 2008 (Application No. 2008-149723), and a Japanese patent application filed on Jun. 18, 2008 (Application No. 2008-159333), the contents thereof being herein incorporated by reference.

INDUSTRIAL APPLICABILITY

According to the invention, a nonaqueous-electrolyte battery having sufficiently enhanced safety during overcharge and further having a high capacity and excellent high-temperature storability and cycle characteristics can be provided, and size reduction and performance advancement in non-aqueous-electrolyte batteries can be attained.

The invention claimed is:
1. A main nonaqueous electrolytic solution, comprising:
an electrolyte; and
a nonaqueous solvent,
wherein the nonaqueous electrolytic solution comprises:
(A) a first nonaqueous electrolytic solution which comprises (a1) a compound of formula (1)

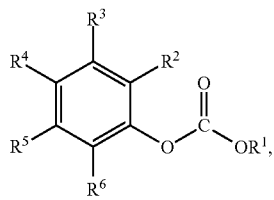

wherein
$R^1$ represents an alkyl group comprising 1-12 carbon atoms, optionally substituted with at least one selected from the group consisting of a halogen atom and a phenyl group, and
$R^2$ to $R^6$ each independently represent a hydrogen atom or a halogen atom, and (a2) at least one compound selected from the group consisting of a cyclic carbonate comprising an unsaturated C=C bond, a cyclic carbonate comprising a fluorine atom, a monofluorophosphoric acid salt, and a difluorophosphoric acid salt;
(a3) a cyclic carbonate selected from the group consisting of ethylene carbonate and propylene carbonate,
(a4) an asymmetric chain dialkyl carbonate, and
(a5) a symmetric chain dialkyl carbonate.

2. The nonaqueous electrolytic solution of claim 1, wherein a content of the compound (a1) of formula (1) in a proportion to the nonaqueous electrolytic solution (A) is 0.001% by weight or higher but less than 10% by weight.

3. The nonaqueous electrolytic solution of claim 1, wherein a content of the at least one compound (a2) in a proportion to the first nonaqueous electrolytic solution (A) is from 0.001% by weight to 10% by weight.

4. A nonaqueous-electrolyte battery, comprising:
a negative electrode and a positive electrode which occlude and release a lithium ion; and
a nonaqueous electrolytic solution,
wherein the nonaqueous electrolytic solution is the main nonaqueous electrolytic solution of claim 1.

* * * * *